(12) United States Patent
Si et al.

(10) Patent No.: US 12,476,855 B2
(45) Date of Patent: Nov. 18, 2025

(54) OFDM SYMBOL ADJUSTMENT FOR SIDELINK TRANSMISSIONS

(71) Applicant: Samsung Electronics Co., Ltd., Suwon-si (KR)

(72) Inventors: Hongbo Si, Plano, TX (US); Emad N. Farag, Flanders, NJ (US); Carmela Cozzo, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 537 days.

(21) Appl. No.: 17/929,253

(22) Filed: Sep. 1, 2022

(65) Prior Publication Data

US 2023/0086544 A1   Mar. 23, 2023

Related U.S. Application Data

(60) Provisional application No. 63/245,572, filed on Sep. 17, 2021.

(51) Int. Cl.
| | |
|---|---|
| *H04L 27/26* | (2006.01) |
| *H04W 72/1263* | (2023.01) |
| *H04W 92/18* | (2009.01) |

(52) U.S. Cl.
CPC ..... *H04L 27/2607* (2013.01); *H04W 72/1263* (2013.01); *H04W 92/18* (2013.01)

(58) Field of Classification Search
CPC .......... H04L 27/2607; H04W 72/1263; H04W 92/18
See application file for complete search history.

(56) References Cited

U.S. PATENT DOCUMENTS

| | | |
|---|---|---|
| 2016/0028572 A1 | 1/2016 | Suzuki et al. |
| 2016/0338021 A1 | 11/2016 | Chae et al. |

(Continued)

FOREIGN PATENT DOCUMENTS

| | | |
|---|---|---|
| WO | 2021071215 A1 | 4/2021 |
| WO | 2021110088 A1 | 6/2021 |
| WO | 2021179112 A1 | 9/2021 |

OTHER PUBLICATIONS

International Search Report and Written Opinion issued Dec. 20, 2022 regarding International Application No. PCT/KR2022/013846, 6 pages.

(Continued)

*Primary Examiner* — Yemane Mesfin

(57) ABSTRACT

Methods and apparatuses for orthogonal frequency division multiplexing (OFDM) symbol adjustment for sidelink (SL) transmissions in a wireless communication system. A method of user equipment (UE) includes receiving a sidelink control information (SCI) format that includes information on a cyclic prefix (CP) extension, determining parameters ($C_i$ and $\Delta_i$) based on the information on the CP extension, and determining a duration for the CP extension based on the parameters. The method further includes extending a sidelink OFDM symbol for an interval preceding the sidelink OFDM symbol for the duration for the CP extension and transmitting the sidelink OFDM symbol with the extended CP duration.

20 Claims, 13 Drawing Sheets

(56) References Cited

U.S. PATENT DOCUMENTS

2021/0194740 A1    6/2021    Aldana et al.
2023/0064680 A1*  3/2023    Huang .............. H04W 74/0816

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.
"3rd Generation Partnership Project; Technical Specification Group Radio Access Network; NR; Multiplexing and channel coding (Release 16)", 3GPP TS 38.212 V16.6.0, Jun. 2021, 153 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.6.0, Jun. 2021, 172 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
Extended European Search Report issued Jun. 3, 2025 regarding Application No. 22870332.8, 7 pages.

\* cited by examiner

OFDM SYMBOL ADJUSTMENT FOR SIDELINK TRANSMISSIONS

CROSS-REFERENCE TO RELATED APPLICATIONS AND CLAIM OF PRIORITY

The present application claims priority to U.S. Provisional Patent Application No. 63/245,572, filed on Sep. 17, 2021. The content of the above-identified patent document is incorporated herein by reference.

TECHNICAL FIELD

The present disclosure relates generally to wireless communication systems and, more specifically, the present disclosure relates to orthogonal frequency division multiplexing (OFDM) symbol adjustment for sidelink transmissions in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to OFDM symbol adjustment for sidelink transmissions in a wireless communication system.

In one embodiment, a user equipment (UE) in a wireless communication system is provided. The UE includes a transceiver configured to receive a sidelink control information (SCI) format that includes information on a cyclic prefix (CP) extension. The UE further includes a processor operably coupled to the transceiver. The processor is configured to determine parameters ($C_i$ and $\Delta_i$) based on the information on the CP extension, determine a duration for the CP extension based on the parameters, and extend a sidelink OFDM symbol for an interval preceding the sidelink OFDM symbol for the duration for the CP extension. The transceiver further configured to transmit the sidelink OFDM symbol with the extended CP duration.

In another embodiment, a method of UE in a wireless communication system is provided. The method includes receiving a SCI format that includes information on a CP extension, determining parameters ($C_i$ and $\Delta_i$) based on the information on the CP extension, determining a duration for the CP extension based on the parameters, extending a sidelink OFDM symbol for an interval preceding the sidelink OFDM symbol for the duration for the CP extension, and transmitting the sidelink OFDM symbol with the extended CP duration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v.16.6.0, "Physical channels and modulation"; 3GPP TS 38.212 v.16.6.0, "Multiplexing and channel coding"; 3GPP TS 38.213 v16.6.0, "NR; Physical Layer Procedures for Control"; 3GPP TS 38.214: v.16.6.0, "Physical layer procedures for data"; and 3GPP TS 38.331 v.16.5.0, "Radio Resource Control (RRC) protocol specification."

Figure 1:
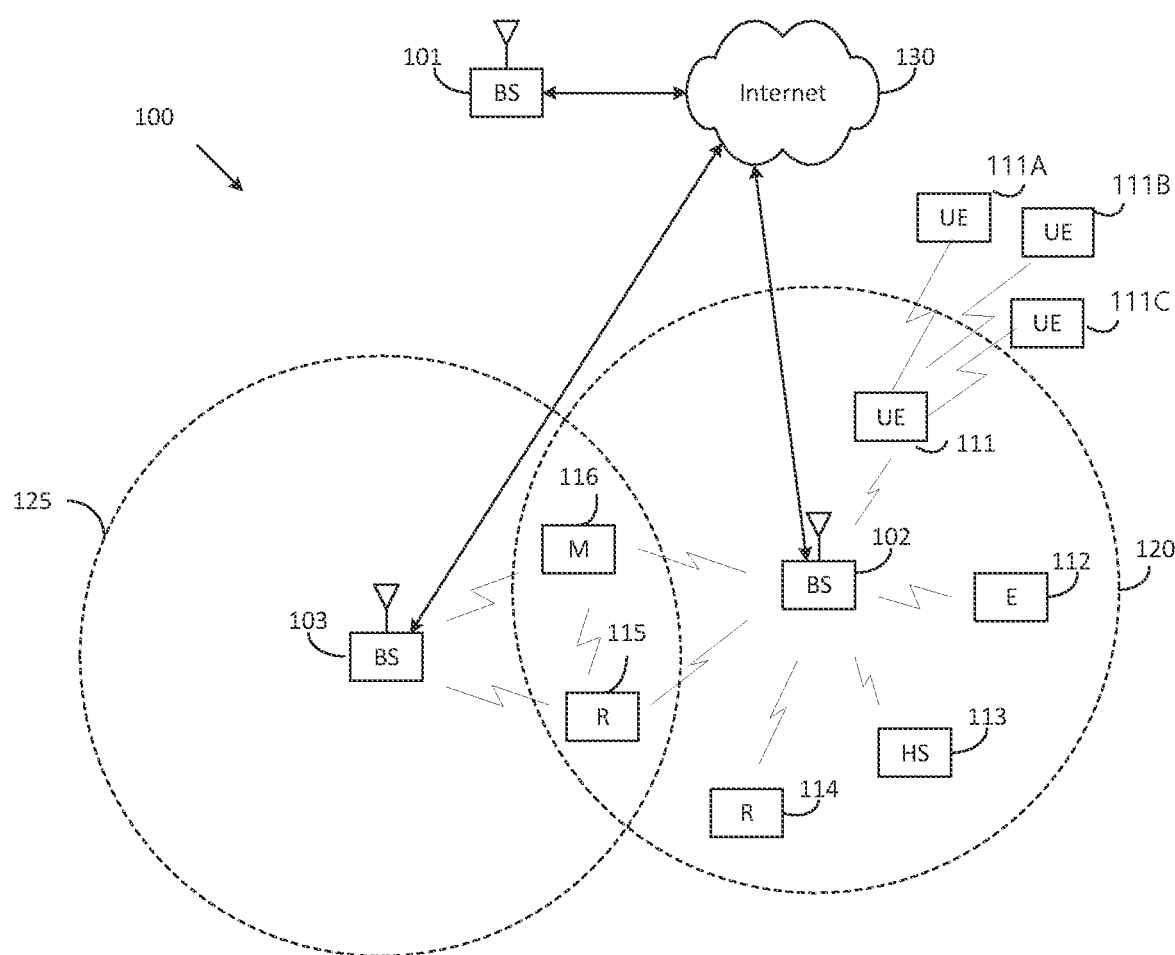
FIG. 1 illustrates an example of wireless network according to various embodiments of the present disclosure.
Figure 2:
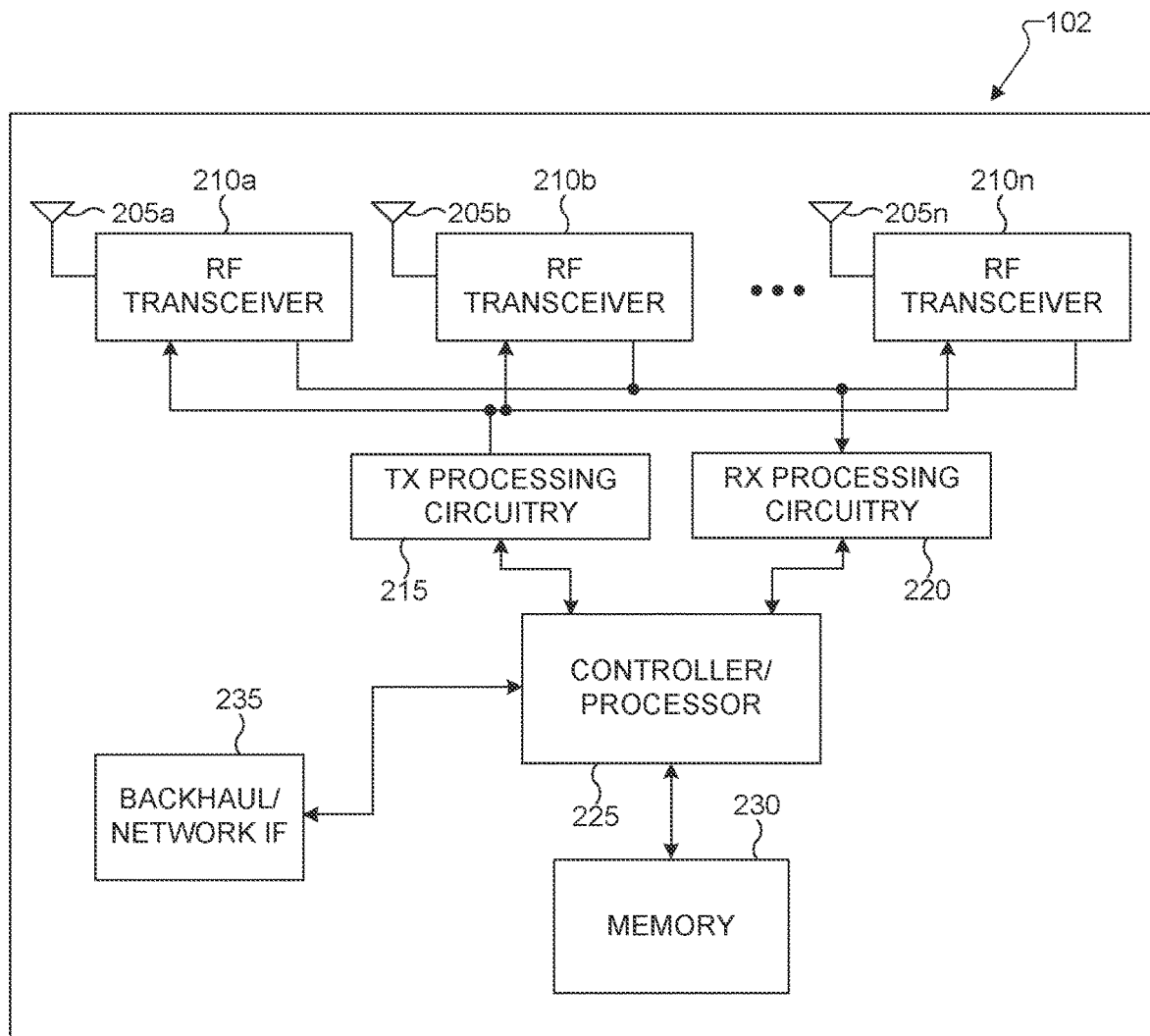
FIG. 2 illustrates an example of gNB according to various embodiments of the present disclosure.
Figure 3:
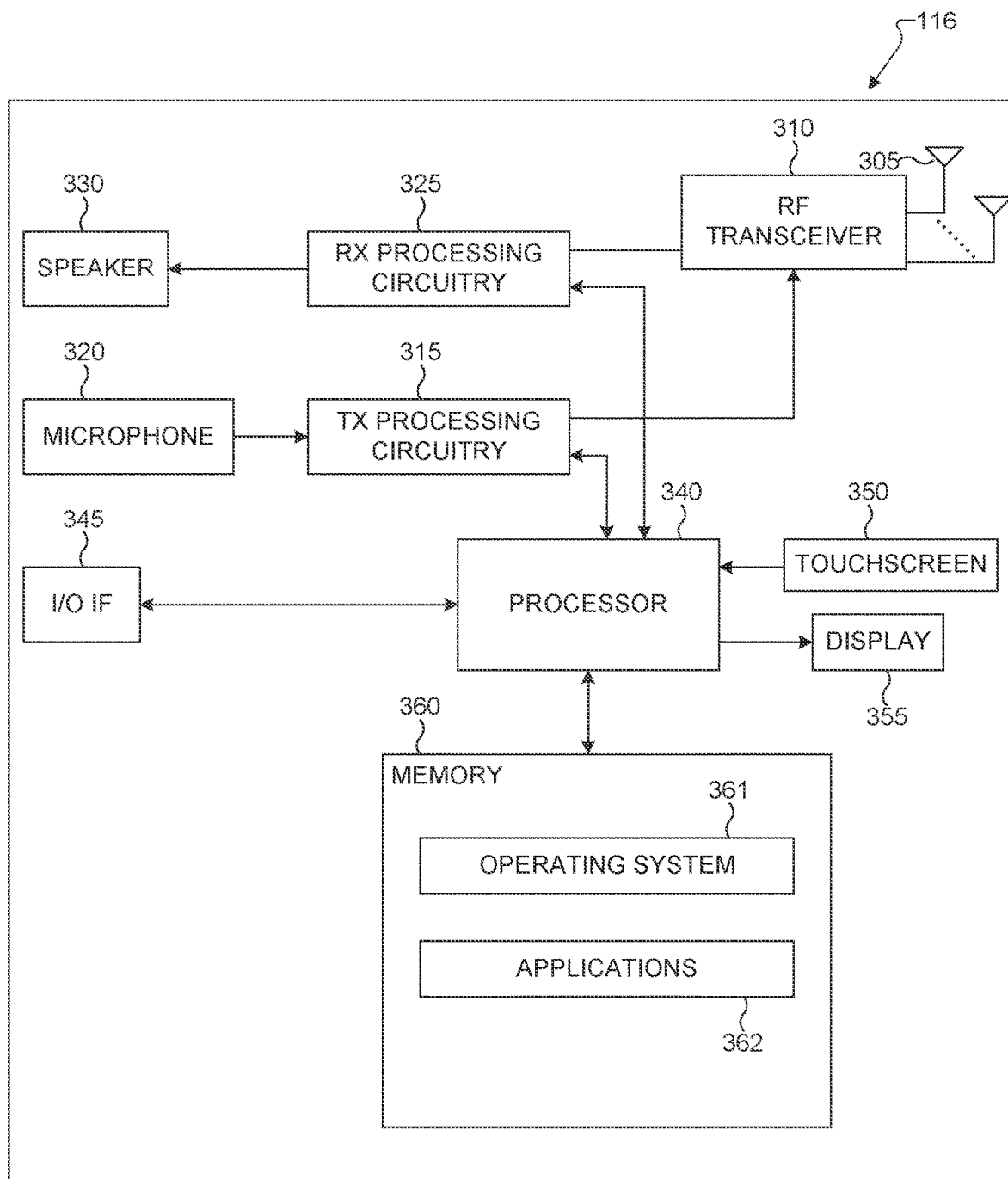
FIG. 3 illustrates an example of UE according to various embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example of wireless network according to embodiments of the present disclosure. The embodiment of the wireless network shown in FIG. 1 is for illustration only. Other embodiments of the wireless network 100 could be used without departing from the scope of this present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In various embodiments, a UE 116 may communicate with another UE 115 via a sidelink (SL). For example, both UEs 115-116 can be within network coverage (of the same or different base stations). In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for OFDM symbols adjustment for SL transmission in a wireless communication system. In certain embodiments, and one or more of the gNBs 101-103 includes circuitry, programming, or a combination thereof, for OFDM symbols adjustment for SL transmission in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs (e.g., via a Uu interface or air interface, which is an interface between a UE and 5G radio access network (RAN)) and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UE 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example of gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support OFDM symbols adjustment for SL transmission in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example of UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100 or by other UEs (e.g., one or more of UEs 111-115) on a SL channel. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink and/or sidelink channel signals and the transmission of uplink and/or sidelink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for OFDM symbols adjustment for SL transmission in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points and a sidelink (SL) that refers to transmissions from one or more UEs to one or more UEs.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
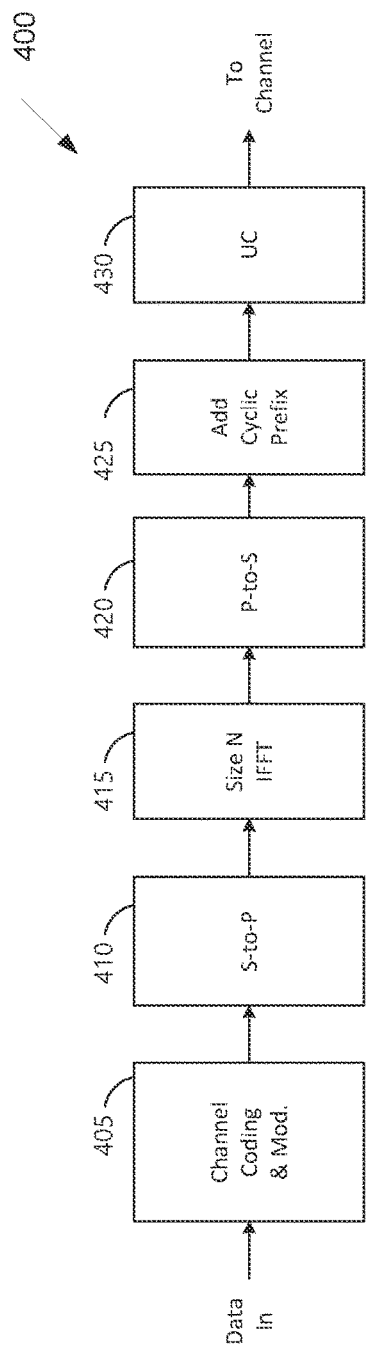
FIGS. 4 and 5 illustrate an example of wireless transmit and receive paths according to various embodiments of the present disclosure.
Figure 5:
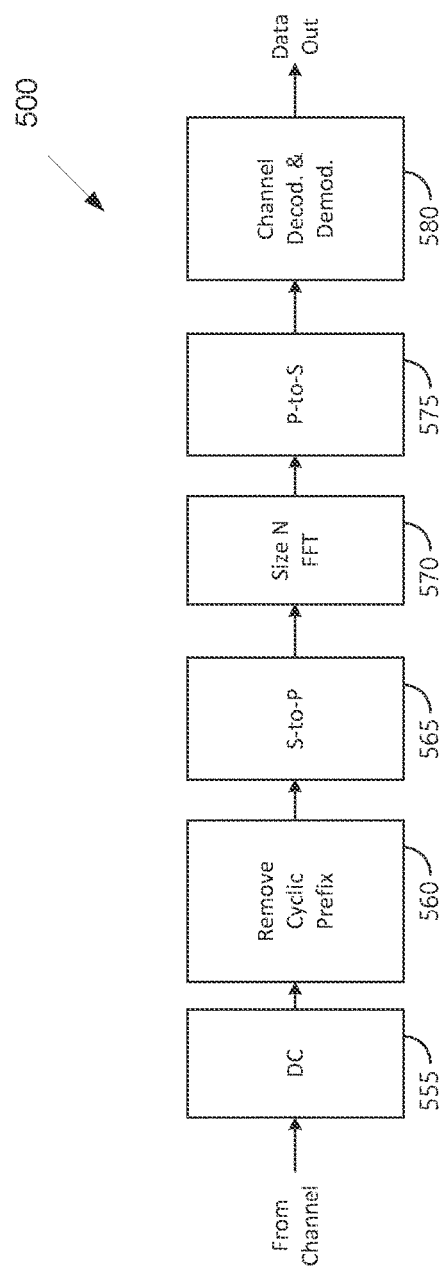

FIG. 4 and FIG. 5 illustrate examples of wireless transmit and receive paths according to this present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support SL measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In Rel-16 NR V2X, transmission and reception of SL signals and channels are based on resource pool(s) confined in the configured SL bandwidth part (BWP). In the frequency domain, a resource pool consists of a (pre-)configured number (e.g., sl-NumSubchannel) of contiguous sub-channels, wherein each sub-channel consists of a set of contiguous resource blocks (RBs) in a slot with size (pre-)configured by higher layer parameter (e.g., sl-SubchannelSize). In a time domain, slots in a resource pool occur with a periodicity of 10240 ms, and slots including sidelink synchronization signal blocks (S-SSB), non-UL slots, and reserved slots are not applicable for a resource pool. The set of slots for a resource pool is further determined within the remaining slots, based on a (pre-)configured bitmap (e.g., sl-TimeResource). An illustration of a resource pool is shown in FIG. 6.

Figure 6:
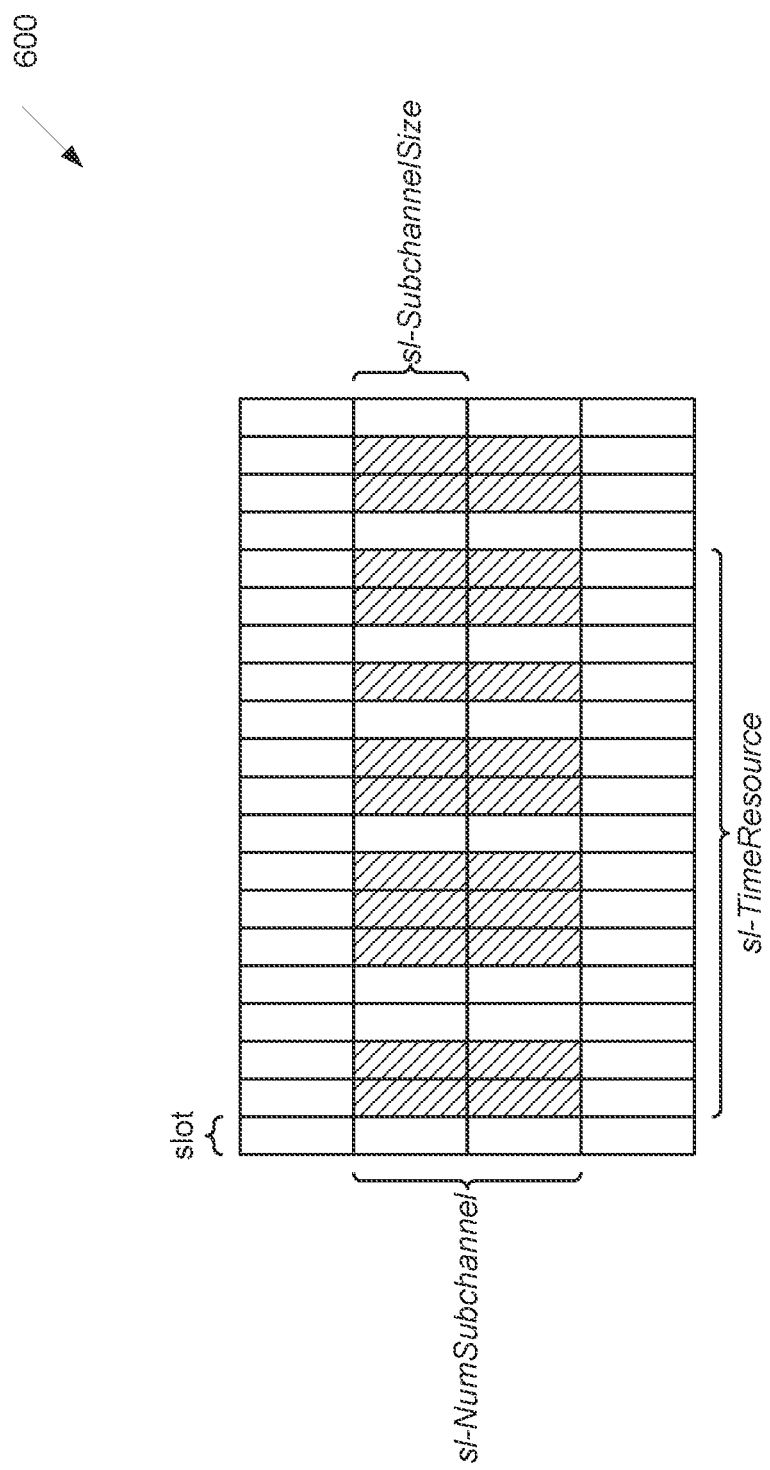
FIG. 6 illustrates an example of resource pool in release 16 (Rel-16) new radio (NR) vehicle to everything (V2X) according to various embodiments of the present disclosure.

FIG. 6 illustrates an example of resource pool in Rel-16 NR V2X 600 according to various embodiments of the present disclosure. An embodiment of the resource pool in Rel-16 NR V2X 600 shown in FIG. 6 is for illustration only.

Transmission and reception of physical sidelink shared channel (PSSCH), physical sidelink control channel (PSCCH), and physical sidelink feedback channel (PSFCH) are confined within and associated with a resource pool, with parameters (pre-)configured by higher layers (e.g., SL-PSSCH-Config, SL-PSCCH-Config, and SL-PSFCH-Config, respectively).

A UE may transmit the PSSCH in consecutive symbols within a slot of the resource pool, and PSSCH resource allocation starts from the second symbol configured for sidelink, e.g., startSLsymbol+1, and the first symbol configured for sidelink is duplicated from the second configured for sidelink, for AGC purpose. The UE may not transmit PSCCH in symbols not configured for sidelink, or in symbols configured for PSFCH, or in the last symbol configured for sidelink, or in the symbol immediately preceding the PSFCH. The frequency domain resource allocation unit for PSSCH is the sub-channel, and the sub-channel assignment is determined using the corresponding field in the associated SCI.

For transmitting a PSCCH, the UE can be provided a number of symbols (either 2 symbols or 3 symbols) in a resource pool (e.g., sl-TimResourcePSCCH) starting from the second symbol configured for sidelink, e.g., startSLsymbol+1; and further provided a number of RBs in the resource pool (e.g., sl-FreqResourcePSCCH) starting from the lowest RB of the lowest sub-channel of the associated PSSCH.

The UE can be further provided a number of slots (e.g., sl-PSFCH-Period) in the resource pool for a period of PSFCH transmission occasion resources, and a slot in the resource pool is determined as containing a PSFCH transmission occasion if the relative slot index within the resource pool is an integer multiple of the period of PSFCH transmission occasion. PSFCH is transmitted in two contiguous symbols in a slot, wherein the second symbol is with index startSLsymbols+lengthSLsymbols−2, and the two symbols are repeated. In frequency domain, PSFCH is transmitted in a single RB, wherein OCC can be possibly applied within the RB for multiplexing, and the location of the RB is determined based on an indication of a bitmap (e.g., sl-PSFCH-RB-Set), and the selection of PSFCH resource is according to the source ID and destination ID.

Figure 7:
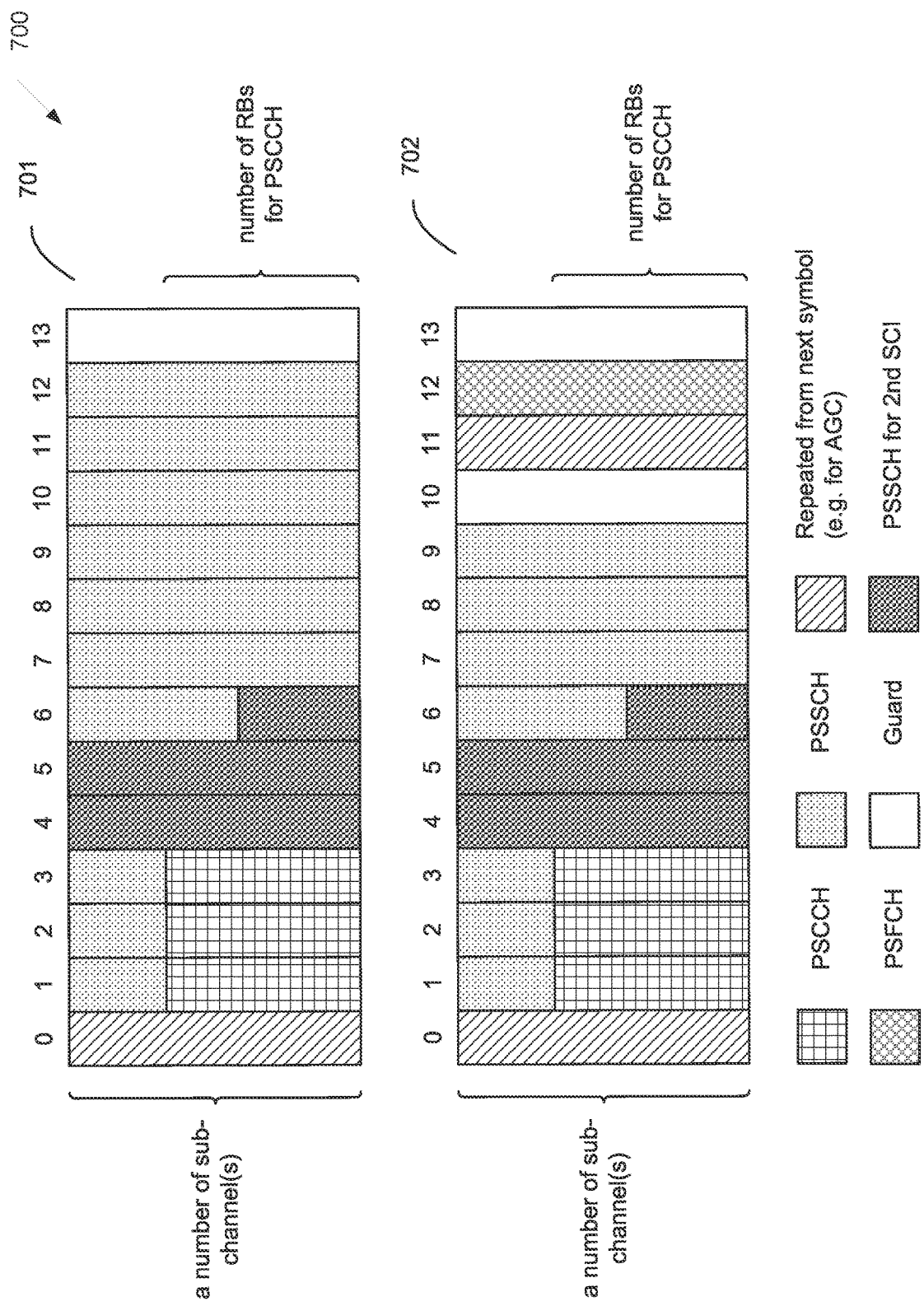
FIG. 7 illustrates an example of slot structure for sidelink (SL) transmission and reception according to various embodiments of the present disclosure.

FIG. 7 illustrates an example of slot structure for SL transmission and reception 700 according to various embodiments of the present disclosure. An embodiment of the slot structure for SL transmission and reception 700 shown in FIG. 7 is for illustration only.

The first symbol including PSSCH and PSCCH is duplicated for AGC purpose. An illustration of the slot structure including PSSCH and PSCCH is shown in 701 of FIG. 7, and the slot structure including PSSCH, PSCCH, and PSFCH is shown in 702 of FIG. 7.

In Rel-16 NR-U, cyclic prefix (CP) extension was supported for uplink transmissions. The time-continuous signal $s_{ext}^{(p,\mu)}(t)$ for the interval $t_{start,l}^{\mu} - T_{ext} \leq t < t_{start,l}^{\mu}$ preceding the first OFDM symbol is given by $s_{ext}^{(p,\mu)}(t) = \bar{s}_l^{(p,\mu)}(t)$.

For dynamically scheduled PUSCH, PUCCH, and SRS, CP extension of the first uplink symbol was supported in order to construct intended gap duration from the previous transmission burst. The duration of the CP extension $T_{ext}$ is given by $T_{ext} = \min(\max(T'_{ext}, 0), T_{symb,(l-1)mod7 \cdot 2^{\mu}})$ wherein $T'_{ext} = \Sigma_{k=1}^{C_i} T_{symb,(l-k)mod7 \cdot 2^{\mu}} - \Delta_i$ and $\Delta_i$ is given by TABLE 1 with $C_1 = 1$ for $\mu \in \{0,1\}$, $C_1 = 2$ for $\mu = 2$, and $C_2$ and $C_3$ given by the higher-layer parameters, and the index of $T_{ext}$ is provided by the scheduling DCI. An illustration of the supported CP extension cases is shown FIG. 8.

Figure 8:
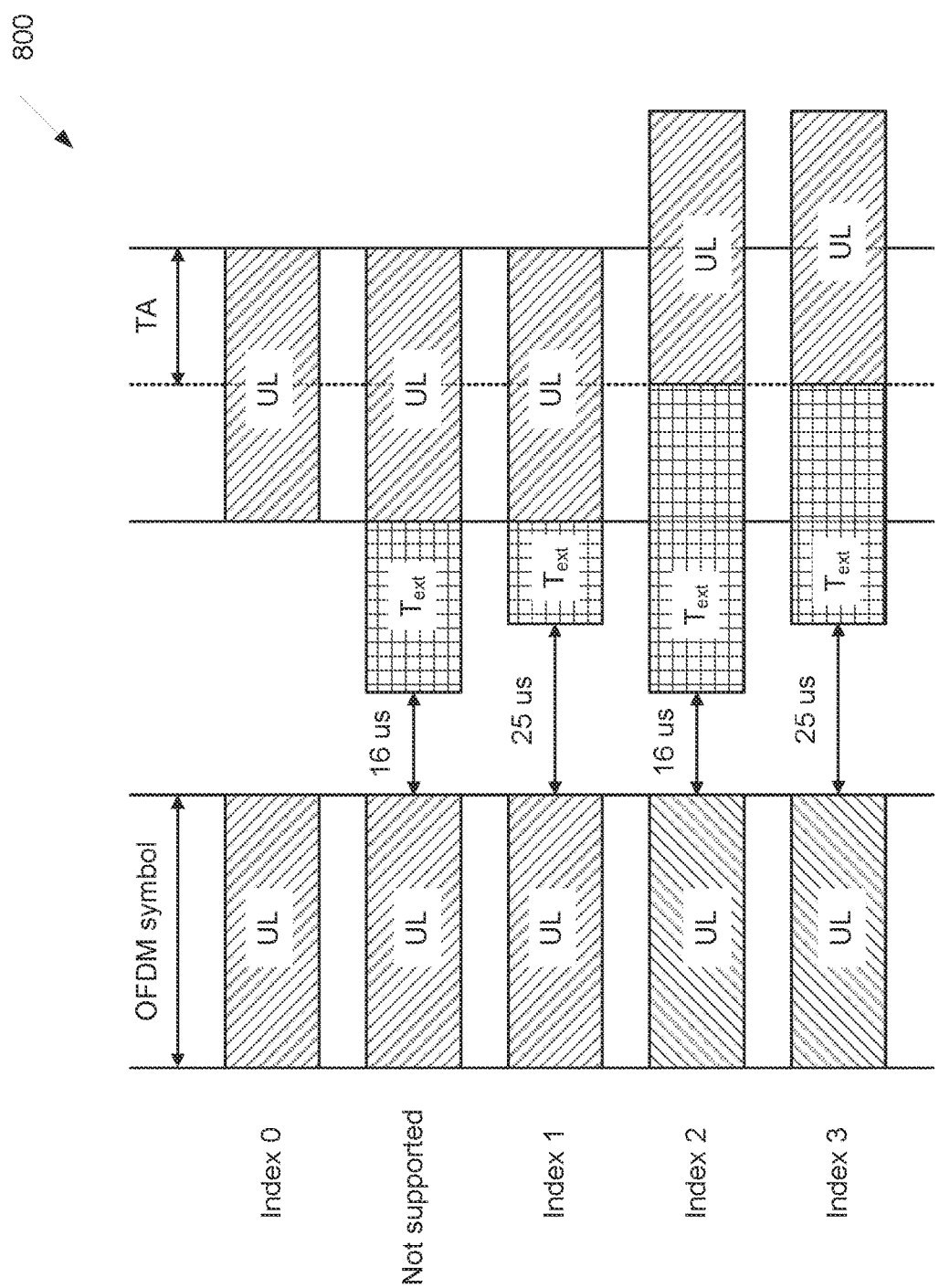
FIG. 8 illustrates an example of CP extension for dynamically scheduled PUSCH, PUCCH, and sounding reference signal (SRS) according to various embodiments of the present disclosure.

FIG. 8 illustrates an example of CP extension for dynamically scheduled PUSCH, PUCCH, and SRS 800 according to various embodiments of the present disclosure. An embodiment of the CP extension for dynamically scheduled PUSCH, PUCCH, and SRS 800 shown in FIG. 8 is for illustration only.

TABLE 1

CP extension parameters for dynamically scheduled PUSCH, PUCCH, and SRS

| $T_{ext}$ index i | $C_i$ | $\Delta_i$ |
|---|---|---|
| 0 | — | — |
| 1 | $C_1$ | $25 \cdot 10^{-6}$ |
| 2 | $C_2$ | $16 \cdot 10^{-6} + T_{TA}$ |
| 3 | $C_3$ | $25 \cdot 10^{-6} + T_{TA}$ |

For sidelink operating on unlicensed spectrum, there is a need to adjust the duration of an OFDM symbol on sidelink, such that the gap between two transmissions can be controlled within an intended duration. In one example, the adjustment of a sidelink OFDM symbol can be a forward extension, e.g., CP extension, in order to shrink the gap from the previous transmission. In another example, the adjustment of a sidelink OFDM symbol can be a backward extension, in order to shrink the gap for the following transmission. In yet another example, the adjustment of a sidelink OFDM symbol can be a truncation from the starting of the symbol (e.g., AGC symbol). This disclosure focuses on the details of the sidelink OFDM duration adjustment for sidelink transmission and the indication of the extension.

In one embodiment, the examples of sidelink symbol adjustment covered in this disclosure can be applicable to at least one sidelink transmission. For one example, the sidelink transmission can be a PSSCH transmission, potentially multiplexed with a PSCCH transmission. For another example, the sidelink transmission can be a PSFCH transmission.

The present disclosure focuses on symbol duration adjustment for sidelink transmissions, including at least sidelink transmissions such as PSSCH and/or PSCCH and/or PSFCH. More precisely, the present disclosure includes following components: (1) forward symbol extension for sidelink transmission; (2) backward symbol extension for sidelink transmission; (3) symbol truncation for sidelink transmission; and (4) sidelink symbol adjustment indication, for example, (i) fixed symbol adjustment in specification;

(ii) symbol adjustment indication by RRC parameter; (iii) symbol adjustment indication by DCI; (iv) symbol adjustment indication by MAC CE; and (v) symbol adjustment indication by SCI; and (5) sidelink and uplink symbol alignment.

In one embodiment, an OFDM symbol for sidelink transmission can be forward extended for a duration of $T_{ext}$. This can also be referred as CP extension.

In one example, the time-continuous signal $s_{ext}^{(p,\mu)}(t)$ for the interval $t_{start,l}^{\mu}-T_{ext} \leq t < t_{start,l}^{\mu}$ preceding the sidelink OFDM symbol can be given by $s_{ext}^{(p,\mu)}(t)=\bar{s}_{l}^{(p,\mu)}(t)$, or $s_{ext}^{(p,\mu)}(t)=\bar{s}^{(p,\mu)}(t+T_{symb,l}^{\mu}-N_{CP,l}^{\mu} \cdot T_c)$, wherein $t_{start,l}^{\mu}$ is the start instance of the sidelink OFDM symbol.

Figure 9:
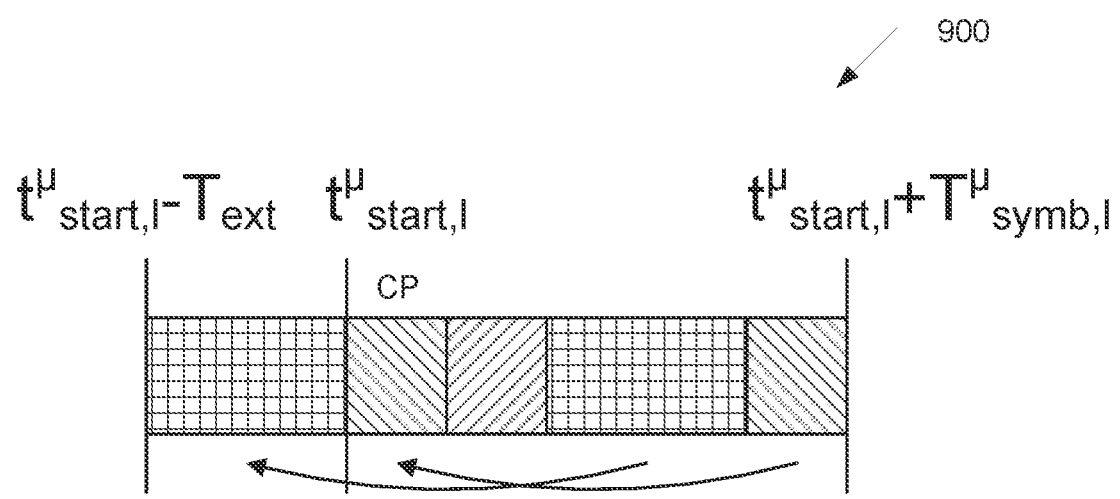
FIG. 9 illustrates an example of forward symbol extension according to various embodiments of the present disclosure.

An illustration of this example for forward symbol extension is shown in FIG. 9, wherein the portions with the same pattern are repeated.

FIG. 9 illustrates an example of forward symbol extension 900 according to various embodiments of the present disclosure. An embodiment of the forward symbol extension 900 shown in FIG. 9 is for illustration only.

In one example, for a sidelink transmission (e.g., PSSCH and/or PSCCH and/or PSFCH), the duration of the forward extension of a sidelink symbol can be limited within one OFDM symbol (e.g., in one sub-example to be equal to the duration of one OFDM symbol), and the corresponding duration $T_{ext}$ is given by $T_{ext}=\min(\max(T'_{ext}, 0), T_{symb,(l-1)mod7 \cdot 2^{\mu}})$, wherein $T'_{ext}=\Sigma_{k=1}^{C_i} T_{symb,(l-k)mod7 \cdot 2^{\mu}}-\Delta_i$.

In another example, for a sidelink transmission (e.g., PSSCH and/or PSCCH and/or PSFCH), the duration of the forward extension of a sidelink symbol can be exceeding one OFDM symbol, and the corresponding duration $T_{ext}$ is given by $T_{ext}=\Sigma_{k=1}^{C_i} T_{symb,(l-k)mod7 \cdot 2^{\mu}}-\Delta_i$.

In one example, the duration of the forward extension of a sidelink symbol can be supported for at least one of the following cases, wherein in the examples, $T_{TA,SL}=N_{TA,offset} \cdot T_C$ is the timing difference for sidelink transmissions comparing to its reference timing, and $T_{TA}$ is the timing advance for uplink transmission.

Figure 10:
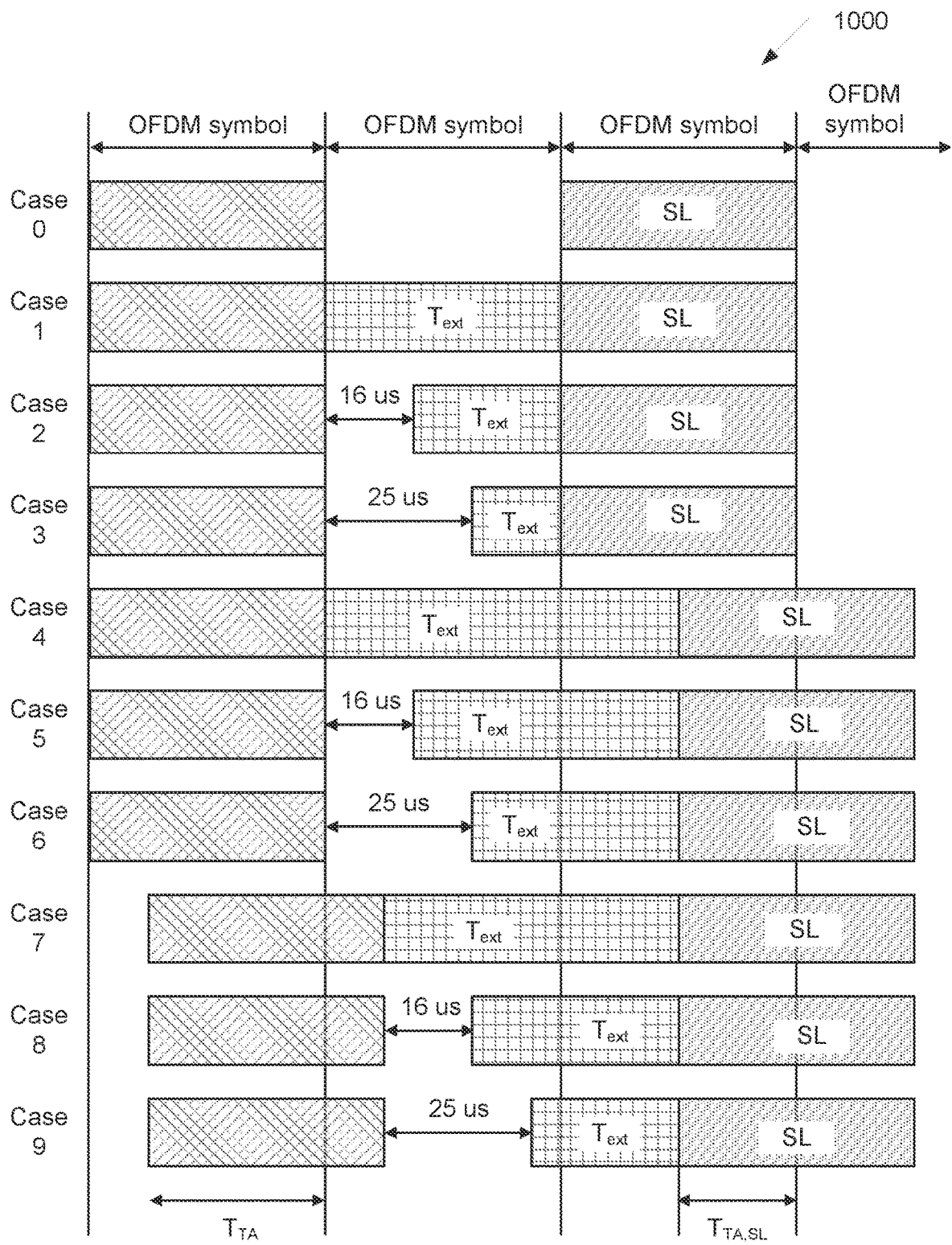
FIG. 10 illustrates an example of forward symbol extension for sidelink transmission according to various embodiments of the present disclosure.

FIG. 10 illustrates an example of forward symbol extension for sidelink transmission 1000 according to various embodiments of the present disclosure. An embodiment of the forward symbol extension for sidelink transmission 1000 shown in FIG. 10 is for illustration only.

In a first case (Case 0 in FIG. 10), there is no forward symbol extension applied to the sidelink transmission.

In a second case (Case 1 in FIG. 10), the duration of forward symbol extension applied to the sidelink transmission is one or more OFDM symbols, and the corresponding value of & is given by TABLE 2. For instance, this case can be applicable to the scenario that the SL transmission has no timing difference comparing to the previous transmission (e.g., the previous transmission has the same timing as the sidelink transmission, such as from the same transmitter UE). In one sub-example, $C_1$ can be fixed for all supported SCSs, e.g., $C_1=1$.

In another sub-example, $C_1$ can be configured by higher layer parameter or provided by a pre-configuration. In yet another sub-example, $C_1$ can be determined by the UE such that the duration of forward symbol extension is within one symbol (e.g., when it's not provided).

In one variant of this case, the forward symbol extension can be symbol repetition(s). For instance, the first symbol of the sidelink transmission is repeated $C_1$ times and transmitted proceeding the sidelink transmission.

In a third case (Case 2 in FIG. 10), the intended gap duration after applying the forward symbol extension applied to the sidelink transmission is 16 us, and the corresponding value of & is given by TABLE 2. For instance, this case can be applicable to the scenario that the SL transmission has no timing difference comparing to the previous transmission (e.g., the previous transmission has the same timing for the sidelink transmission). In one sub-example, $C_2$ can be fixed for a given SCS, e.g., $C_2=1$ for 15 kHz, 30 kHz and 60 kHz SCS. In another sub-example, $C_2$ can be configured by higher layer parameter or provided by a pre-configuration. In yet another sub-example, $C_2$ can be determined by the UE such that the duration of forward symbol extension is within one symbol (e.g., when it's not provided).

In a fourth case (Case 3 in FIG. 10), the intended gap duration after applying the forward symbol extension applied to the sidelink transmission is 25 us, and the corresponding value of & is given by TABLE 2. For instance, this case can be applicable to the scenario that the SL transmission has no timing difference comparing to the previous transmission (e.g., the previous transmission has the same timing for the sidelink transmission). In one sub-example, $C_3$ can be fixed for a given SCS, e.g., $C_3=1$ for 15 kHz and 30 kHz SCS, and $C_3=2$ for 60 kHz. In another sub-example, $C_3$ can be configured by higher layer parameter or provided by a pre-configuration. In yet another sub-example, $C_3$ can be determined by the UE such that the duration of forward symbol extension is within one symbol (e.g., when it's not provided).

In a fifth case (Case 4 in FIG. 10), the intended gap duration after applying the forward symbol extension applied to the sidelink transmission is 0, and the corresponding value of & is given by TABLE 2. For instance, this case can be applicable to the scenario that the SL transmission has a timing difference comparing to the previous transmission (e.g., the previous transmission is using the reference timing for sidelink transmission). In one sub-example, $C_4$ can be configured by higher layer parameter or provided by a pre-configuration. In another sub-example, $C_4$ can be determined based on the value of n-TimingAdvanceOffset and/or the SCS, e.g., $C_4=1$ for all SCS when n-TimingAdvanceOffset is "n0"; $C_4=1$ for all SCS when n-TimingAdvanceOffset is "n25600"; $C_4=1$ for 15 kHz and 30 kHz and $C_4=2$ for 60 kHz when n-TimingAdvanceOffset is "n39936." In yet another sub-example, $C_4$ can be determined by the UE such that the duration of forward symbol extension is within one symbol (e.g., when it's not provided).

In a sixth case (Case 5 in FIG. 10), the intended gap duration after applying the forward symbol extension applied to the sidelink transmission is 16 us, and the corresponding value of & is given by TABLE 2. For instance, this case can be applicable to the scenario that the SL transmission has a timing difference comparing to the previous transmission (e.g., the previous transmission is using the reference timing for sidelink transmission). In one sub-example, $C_5$ can be configured by higher layer parameter or provided by a pre-configuration. In another sub-example, $C_5$ can be determined based on the value of n-TimingAdvanceOffset and/or the SCS, e.g., $C_5=1$ for all SCS when n-TimingAdvanceOffset is "n0"; $C_5=1$ for 15 kHz and 30 kHz and $C_5=2$ for 60 kHz when n-TimingAdvanceOffset is "n25600"; $C_5=1$ for 15 kHz, $C_5=2$ for 30 kHz, and $C_5=3$ for 60 kHz when n-TimingAdvanceOffset is "n39936." In yet another sub-example, $C_5$ can be determined by the UE such that the duration of forward symbol extension is within one symbol (e.g., when it's not provided).

In a seventh case (Case 6 in FIG. 10), the intended gap duration after applying the forward symbol extension applied to the sidelink transmission is 16 us, and the corresponding value of & is given by TABLE 2. For instance, this case can be applicable to the scenario that the SL transmission has a timing difference comparing to the previous transmission (e.g., the previous transmission is using the reference timing for sidelink transmission). In one sub-example, $C_6$ can be configured by higher layer parameter or provided by a pre-configuration. In another sub-example, $C_6$ can be determined based on the value of sidelink TA and/or the SCS, e.g., $C_6$=1 for 15 kHz and 30 kHz and $C_6$=2 for 60 kHz when n-TimingAdvanceOffset is "n0"; $C_6$=1 for 15 kHz, $C_6$=2 for 30 kHz, and $C_6$=3 for 60 kHz when n-TimingAdvanceOffset is "n25600"; $C_6$=1 for 15 kHz, $C_6$=2 for 30 kHz, and $C_6$=3 for 60 kHz when n-TimingAdvanceOffset is "n39936." In yet another sub-example, $C_6$ can be determined by the UE such that the duration of forward symbol extension is within one symbol (e.g., when it's not provided).

In an eighth case (Case 7 in FIG. 10), the intended gap duration after applying the forward symbol extension applied to the sidelink transmission is 0, and the corresponding value of & is given by TABLE 2. For instance, this case can be applicable to the scenario that the SL transmission has a timing difference comparing to the previous transmission, wherein the timing difference is denoted as $\Delta T_{TA}$ (e.g., the previous transmission is using a different reference timing from the sidelink transmission). In one sub-example, $C_7$ can be configured by higher layer parameter or provided by a pre-configuration. In yet another sub-example, $C_7$ can be determined by the UE such that the duration of forward symbol extension is within one symbol (e.g., when it's not provided).

In a ninth case (Case 8 in FIG. 10), the intended gap duration after applying the forward symbol extension applied to the sidelink transmission is 16 us, and the corresponding value of & is given by TABLE 2. For instance, this case can be applicable to the scenario that the SL transmission has a timing difference comparing to the previous transmission, wherein the timing difference is denoted as $\Delta T_{TA}$ (e.g., the previous transmission is using a different reference timing from the sidelink transmission). In one sub-example, $C_8$ can be configured by higher layer parameter or provided by a pre-configuration. In yet another sub-example, $C_8$ can be determined by the UE such that the duration of forward symbol extension is within one symbol (e.g., when it's not provided).

In a tenth case (Case 9 in FIG. 10), the intended gap duration after applying the forward symbol extension applied to the sidelink transmission is 25 us, and the corresponding value of & is given by TABLE 2. For instance, this case can be applicable to the scenario that the SL transmission has a timing difference comparing to the previous transmission, wherein the timing difference is denoted as $\Delta T_{TA}$ (e.g., the previous transmission is using a different reference timing from the sidelink transmission). In one sub-example, $C_9$ can be configured by higher layer parameter or provided by a pre-configuration. In yet another sub-example, $C_9$ can be determined by the UE such that the duration of forward symbol extension is within one symbol (e.g., when it's not provided).

For $\Delta T_{TA}$ in the above examples, it can include at least one of the timing differences: 1) when the previous transmission is a SL transmission, $\Delta T_{TA}$ can include the propagation delay difference between the transmission and the previous transmission $T_{prop}$; 2) when the previous transmission is a SL transmission, and the timing references of the SL transmission and the previous SL transmission are not synchronized, $\Delta T_{TA}$ can include the timing difference of the timing references $\Delta T_{sync}$; 3) when the previous transmission is a UL transmission, $\Delta T_{TA}$ can include the timing difference between the sidelink transmission and the uplink TA, e.g., $\Delta T_{TA} = T_{TA,SL} - T_{TA}$; 4) when the previous transmission is a UL transmission, and the timing reference of the SL transmission has a timing difference from the DL timing associated with the UL transmission, then $\Delta T_{TA}$ can include such timing difference $\Delta T_{sync}$.

TABLE 2

Parameters of forward symbol extension for SL sidelink transmission

| $T_{ext}$ index i | $C_i$ | $\Delta_i$ |
|---|---|---|
| 0 | — | — |
| 1 | $C_1$ | 0 |
| 2 | $C_2$ | $16 \cdot 10^{-6}$ |
| 3 | $C_3$ | $25 \cdot 10^{-6}$ |
| 4 | $C_4$ | $T_{TA, SL}$ |
| 5 | $C_5$ | $16 \cdot 10^{-6} + T_{TA, SL}$ |
| 6 | $C_6$ | $25 \cdot 10^{-6} + T_{TA, SL}$ |
| 7 | $C_7$ | $\Delta T_{TA}$ |
| 8 | $C_8$ | $16 \cdot 10^{-6} + \Delta T_{TA}$ |
| 9 | $C_9$ | $25 \cdot 10^{-6} + \Delta T_{TA}$ |

In one embodiment, an OFDM symbol for sidelink transmission can be backward extended for a duration of $T_{ext}$.

Figure 11:
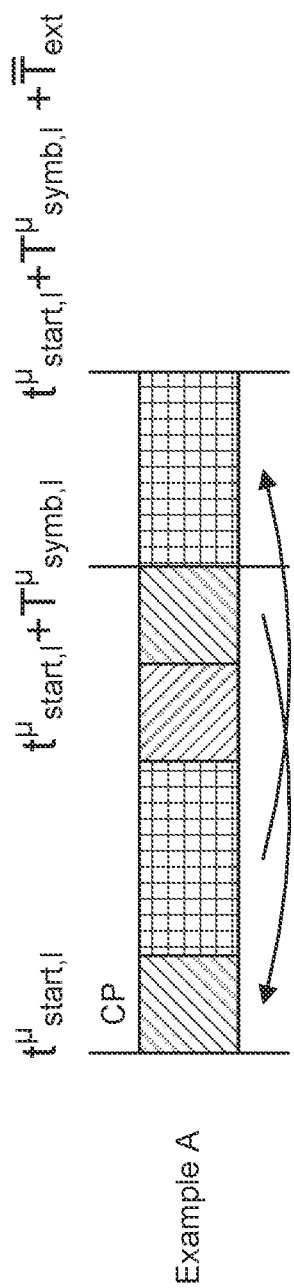
FIG. 11 illustrates an example of backward symbol extension according to various embodiments of the present disclosure.
Figure 11:
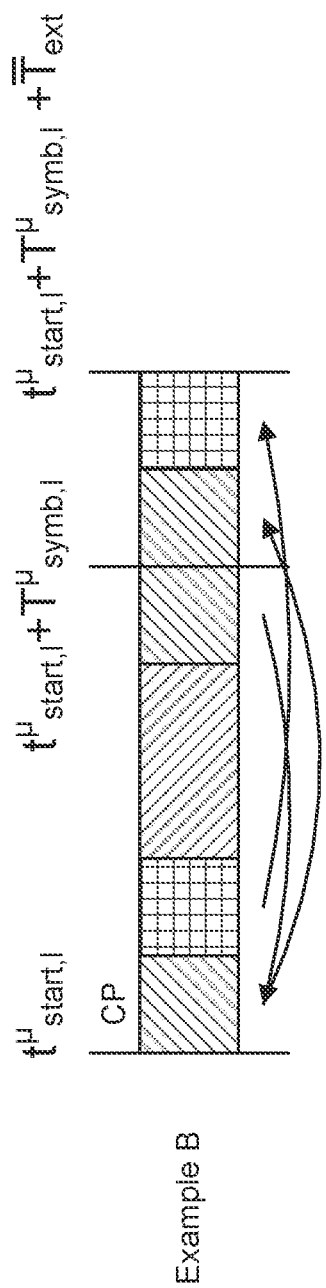

FIG. 11 illustrates an example of backward symbol extension 1100 according to various embodiments of the present disclosure. An embodiment of the backward symbol extension 1100 shown in FIG. 11 is for illustration only.

For one example, the time-continuous signal $s_{ext}^{(p,\mu)}(t)$ for the interval $t_{start,l}^{\mu} + T_{symb,l}^{\mu} \leq t < t_{start,l}^{\mu} + T_{symb,l}^{\mu} + T_{ext}$ succeeding the sidelink OFDM symbol is given by $s_{ext}^{(p,\mu)}(t) = \overline{s}_l^{(p,\mu)}(t)$, or $s_{ext}^{(p,\mu)}(t) = \overline{s}_l^{(p,\mu)}(t - T_{symb,l}^{\mu} + N_{CP,l}^{\mu} \cdot T_c)$, and an illustration of this example for backward symbol extension is shown in Example A of FIG. 11, wherein the portions with the same pattern are repeated.

For another example, the time-continuous signal $s_{ext}^{(p,\mu)}(t)$ for the interval $t_{start,l}^{\mu} + T_{symb,l}^{\mu} \leq t < t_{start,l}^{\mu} + T_{symb,l}^{\mu} + T_{ext}$ succeeding the sidelink OFDM symbol is given by $s_{ext}^{(p,\mu)}(t) = \overline{s}_l^{(p,\mu)}(t - n_{CP,l}^{\mu} \cdot T_c)$, or $s_{ext}^{(p,\mu)}(t) = \overline{s}_l^{(p,\mu)}(t - T_{symb,l}^{\mu})$, and an illustration of this example for backward symbol extension is shown in Example B of FIG. 11, wherein the portions with the same pattern are repeated.

In one example, for a sidelink transmission (e.g., PSSCH and/or PSCCH and/or PSFCH), the duration of the backward extension of a sidelink symbol can be limited within one OFDM symbol, and the corresponding duration $T_{ext}$ is given by $T_{ext} = \min(\max(T'_{ext}, 0), T_{symb,(l+1) \mod 7 \cdot 2^\mu})$, wherein $T'_{ext} = \Sigma_{k=1}^{D_i} T_{symb,(l+k) \mod 7 \cdot 2^\mu} - \Delta_i$.

In another example, for a sidelink transmission (e.g., PSSCH and/or PSCCH), the duration of the backward extension of a sidelink symbol can be exceeding one OFDM symbol, and the corresponding duration $\overline{T}_{ext}$ is given by $\overline{T}_{ext} = \Sigma_{k=1}^{D_i} T_{symb,(l+k) \mod 7 \cdot 2^\mu} - \Delta_i$.

In one example, the duration of the backward extension of a sidelink symbol can be supported for at least one of the following cases, wherein in the examples, $T_{TA,SL} = N_{TA,offset} \cdot T_C$ is the timing difference for sidelink transmissions comparing to its reference timing, and $T_{TA}$ is the timing advance for uplink transmission.

Figure 12:
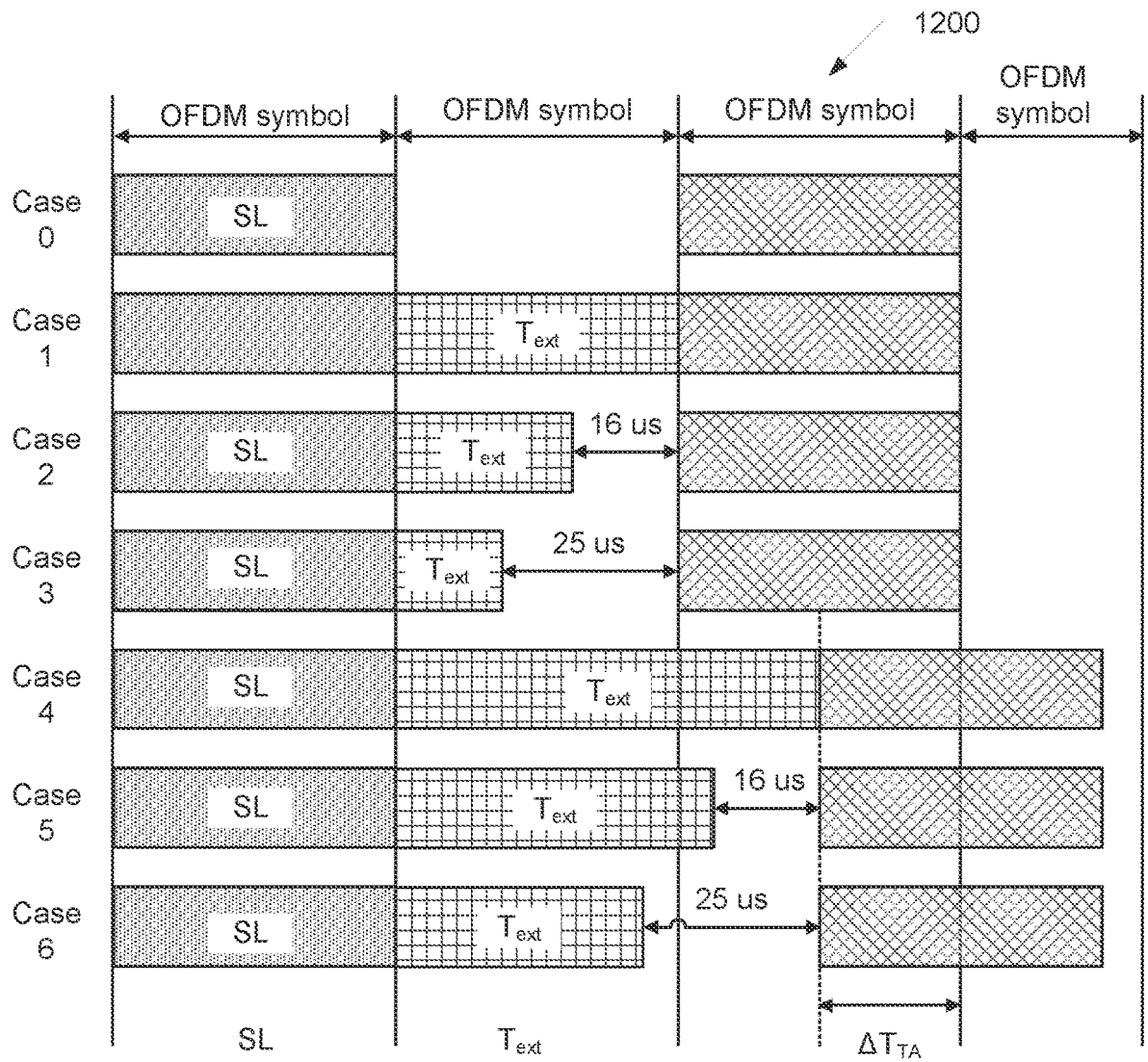
FIG. 12 illustrates an example of backward symbol extension for sidelink transmission according to various embodiments of the present disclosure.

FIG. 12 illustrates an example of backward symbol extension for sidelink transmission 1200 according to various embodiments of the present disclosure. An embodiment of the backward symbol extension for sidelink transmission 1200 shown in FIG. 12 is for illustration only.

In a first case (Case 0 in FIG. 12), there is no backward symbol extension applied to the sidelink transmission.

In a second case (Case 1 in FIG. 12), the duration of backward symbol extension applied to the sidelink transmission is one or more OFDM symbols, and the corresponding value of $\Delta_i$ is given by TABLE 3. For instance, this case can be applicable to the scenario that the SL transmission has no timing difference comparing to the following transmission (e.g., the following transmission has the same timing for the sidelink transmission). In one sub-example, $D_1$ can be fixed for all supported SCSs, e.g., $D_1=1$. In another sub-example, $D_1$ can be configured by higher layer parameter or provided by a pre-configuration. In yet another sub-example, $D_1$ can be determined by the UE such that the duration of backward symbol extension is within one symbol.

In one variant of this case, the backward symbol extension can be symbol repetition(s). For instance, the backward extension is using Example B of FIG. 11, and the last symbol of the sidelink transmission is repeated $D_1$ times and transmitted following the sidelink transmission.

In a third case (Case 2 in FIG. 12), the intended gap duration after applying the backward symbol extension applied to the sidelink transmission is 16 us, and the corresponding value of & is given by TABLE 3. For instance, this case can be applicable to the scenario that the SL transmission has no timing difference comparing to the following transmission (e.g., the following transmission has the same timing for the sidelink transmission). In one sub-example, $D_2$ can be fixed for a given SCS, e.g., $D_2=1$ for 15 kHz, 30 kHz and 60 kHz SCS. In another sub-example, $D_2$ can be configured by higher layer parameter or provided by a pre-configuration. In yet another sub-example, $D_2$ can be determined by the UE such that the duration of backward symbol extension is within one symbol.

In a fourth case (Case 3 in FIG. 12), the intended gap duration after applying the backward symbol extension applied to the sidelink transmission is 25 us, and the corresponding value of & is given by TABLE 3. For instance, this case can be applicable to the scenario that the SL transmission has no timing difference comparing to the following transmission (e.g., the following transmission has the same timing for the sidelink transmission). In one sub-example, $D_3$ can be fixed for a given SCS, e.g., $D_3=1$ for 15 kHz and 30 kHz SCS, and $D_3=2$ for 60 kHz. In another sub-example, $D_3$ can be configured by higher layer parameter or provided by a pre-configuration. In yet another sub-example, $D_3$ can be determined by the UE such that the duration of backward symbol extension is within one symbol.

In a fifth case (Case 4 in FIG. 12), the intended gap duration after applying the backward symbol extension applied to the sidelink transmission is 0, and the corresponding value of $\Delta_i$ is given by TABLE 3. For instance, this case can be applicable to the scenario that the SL transmission has a timing difference comparing to the following transmission, wherein the timing difference is denoted as $\Delta T_{T4}$. In one sub-example, $D_4$ can be configured by higher layer parameter or provided by a pre-configuration. In yet another sub-example, $D_4$ can be determined by the UE such that the duration of backward symbol extension is within one symbol.

In a sixth case (Case 5 in FIG. 12), the intended gap duration after applying the backward symbol extension applied to the sidelink transmission is 16 us, and the corresponding value of & is given by TABLE 3. For instance, this case can be applicable to the scenario that the SL transmission has a timing difference comparing to the following transmission, wherein the timing difference is denoted as $\Delta T_{T4}$. In one sub-example, $D_5$ can be configured by higher layer parameter or provided by a pre-configuration. In yet another sub-example, $D_5$ can be determined by the UE such that the duration of backward symbol extension is within one symbol.

In a seventh case (Case 6 in FIG. 12), the intended gap duration after applying the backward symbol extension applied to the sidelink transmission is 16 us, and the corresponding value of & is given by TABLE 3. For instance, this case can be applicable to the scenario that the SL transmission has a timing difference comparing to the following transmission, wherein the timing difference is denoted as $\Delta T_{T4}$. In one sub-example, $D_6$ can be configured by higher layer parameter or provided by a pre-configuration. In yet another sub-example, $D_6$ can be determined by the UE such that the duration of backward symbol extension is within one symbol.

For $\Delta T_{T4}$ in the above examples, it can include at least one of the timing differences: 1) when the following transmission is a SL transmission, $\Delta T_{T4}$ can include the propagation delay difference between the transmission and the following transmission $T_{prop}$; 2) when the following transmission is a SL transmission, and the timing references of the SL transmission and the following SL transmission are not synchronized, $\Delta T_{T4}$ can include the timing difference of the timing references $\Delta T_{sync}$; 3) when the following transmission is a UL transmission, $\Delta T_{T4}$ can include the timing difference between the sidelink transmission and the uplink TA, e.g., $\Delta T_{T4} = T_{TA,SL} - T_{TA}$; 4) when the following transmission is a UL transmission, and the timing reference of the SL transmission has a timing difference from the DL timing associated with the UL transmission, then $\Delta T_{T4}$ can include such timing difference $\Delta T_{sync}$.

TABLE 3

Parameters of backward symbol extension for sidelink transmission

| $T_{ext}$ index i | $D_i$ | $\Delta_i$ |
|---|---|---|
| 0 | — | — |
| 1 | $D_1$ | 0 |
| 2 | $D_2$ | $16 \cdot 10^{-6}$ |
| 3 | $D_3$ | $25 \cdot 10^{-6}$ |
| 4 | $D_4$ | $\Delta T_{T4}$ |
| 5 | $D_5$ | $16 \cdot 10^{-6} + \Delta T_{T4}$ |
| 6 | $D_6$ | $25 \cdot 10^{-6} + \Delta T_{T4}$ |

Figure 13:
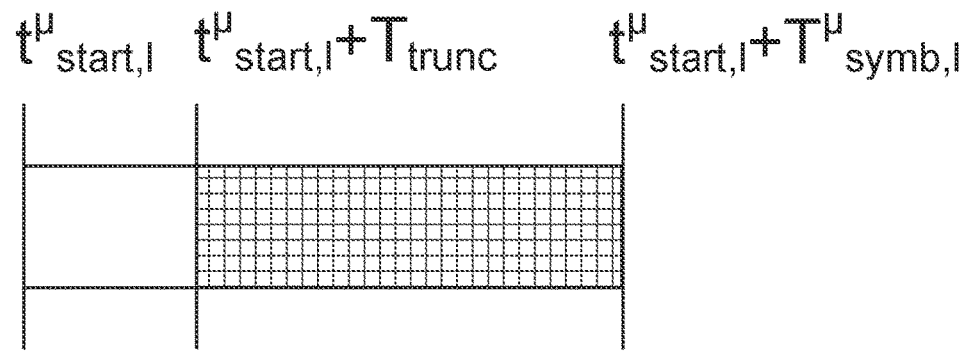
FIG. 13 illustrates an example of symbol truncation according to various embodiments of the present disclosure.

FIG. 13 illustrates an example of symbol truncation 1300 according to various embodiments of the present disclosure. An embodiment of the symbol truncation 1300 shown in FIG. 13 is for illustration only.

In one embodiment, an OFDM symbol for sidelink transmission can be truncated from the starting of the symbol for a duration of $T_{trunc}$. For instance, the symbol to be truncated can be the symbol for AGC purpose. For example, the time-continuous signal $s_{ext}^{(p,\mu)}(t)$ for the interval $t_{start,i}^{\mu} \leq t < t_{start,i}^{\mu} + T_{trunc}$ for the first OFDM symbol is given by $s_{ext}^{(p,\mu)}(t) = 0$, and an illustration of this example for symbol truncation is shown in FIG. 13, wherein the portion without filling pattern is truncated.

In one example, for a sidelink transmission (e.g., PSSCH and/or PSCCH and/or PSFCH), the duration of the truncation of a sidelink symbol can be limited within one OFDM symbol, and the corresponding duration $T_{trunc}$ is given by $T_{trunc}=\min(\max(T'_{trunc}, 0), T_{symb,i}^{\mu})$, wherein $T'_{trunc}=\Delta_i - \sum_{k=1}^{E_i} T_{symb,(l-k+1)mod7 \cdot 2^{\mu}}^{\mu}$.

In one example, the duration of the truncation of a sidelink symbol can be supported for at least one of the following cases, wherein in the examples, $T_{TA,SL} = N_{TA,offset} \cdot T_C$ is the timing difference for sidelink transmissions comparing to its reference timing, and $T_{TA}$ is the timing advance for uplink transmission.

Figure 14:
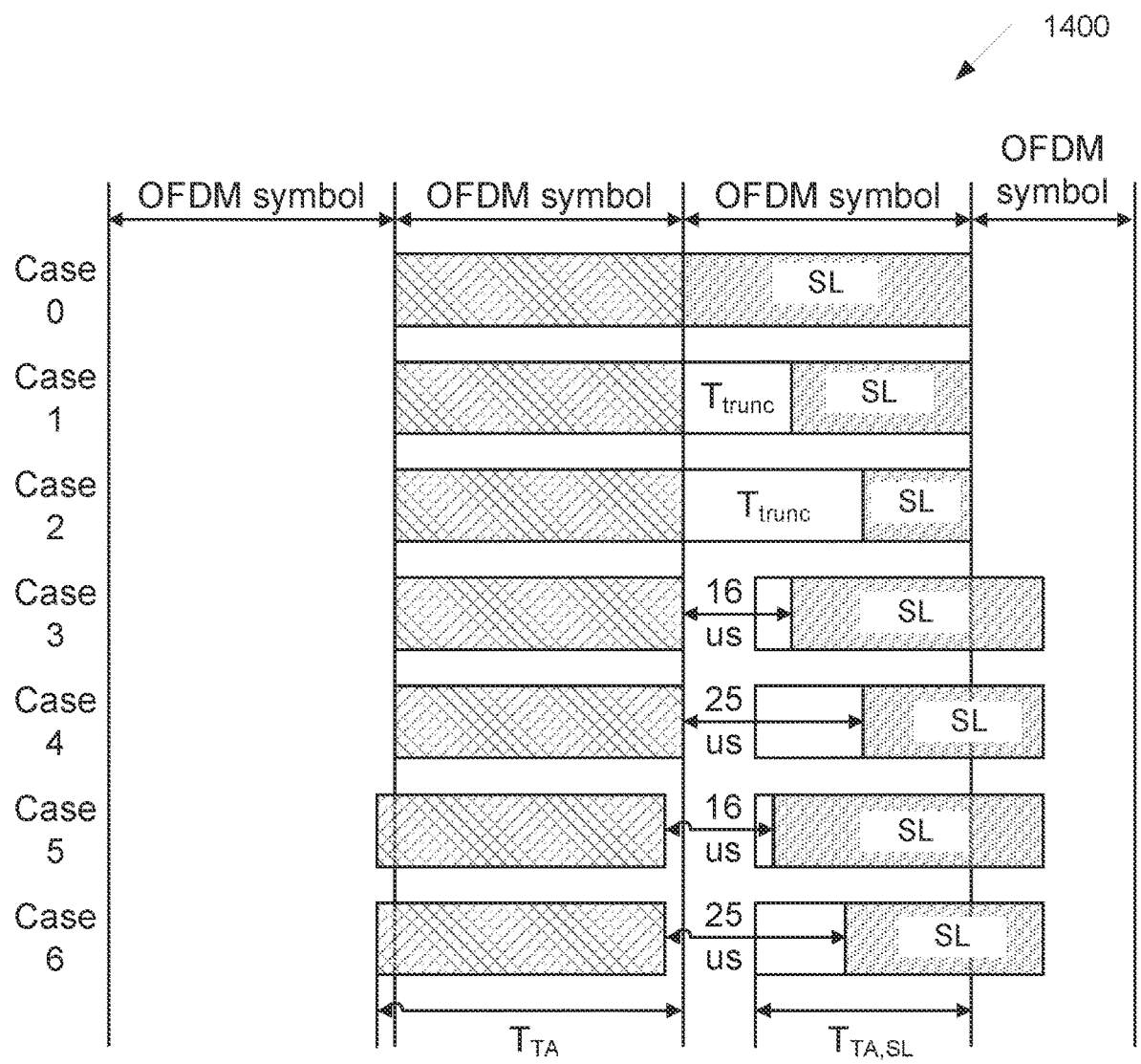
FIG. 14 illustrates an example of symbol truncation for sidelink transmission according to various embodiments of the present disclosure.

FIG. 14 illustrates an example of symbol truncation for sidelink transmission 1400 according to various embodiments of the present disclosure. An embodiment of the symbol truncation for sidelink transmission 1400 shown in FIG. 14 is for illustration only.

In a first case (Case 0 in FIG. 14), there is no truncation applied to the sidelink transmission.

In a second case (Case 1 in FIG. 14), the intended gap duration after applying the symbol truncation applied to the sidelink transmission is 16 us, and the corresponding value of $\Delta_i$ is given by TABLE 4. For instance, this case can be applicable to the scenario that the SL transmission has no timing difference comparing to the previous transmission (e.g., the previous transmission has the same timing for the sidelink transmission). In one sub-example, $E_1$ can be fixed for some SCSs, e.g., $E_1=0$ for 15 kHz, 30 kHz, and/or 60 kHz SCS. In another sub-example, $E_1$ can be configured by higher layer parameter or provided by a pre-configuration. In yet another sub-example, $E_1$ can be determined by the UE such that the truncation of the symbol is within one symbol.

In a third case (Case 2 in FIG. 14), the intended gap duration after applying the symbol truncation applied to the sidelink transmission is 25 us, and the corresponding value of & is given by TABLE 4. For instance, this case can be applicable to the scenario that the SL transmission has no timing difference comparing to the previous transmission (e.g., the previous transmission has the same timing for the sidelink transmission). In one sub-example, $E_2$ can be fixed for some SCSs, e.g., $E_2=0$ for 15 kHz and 30 kHz. In another sub-example, $E_2$ can be configured by higher layer parameter or provided by a pre-configuration. In yet another sub-example, $E_2$ can be determined by the UE such that the truncation of the symbol is within one symbol.

In a fourth case (Case 3 in FIG. 14), the intended gap duration after applying the symbol truncation applied to the sidelink transmission is 16 us, and the corresponding value of & is given by TABLE 4. For instance, this case can be applicable to the scenario that the SL transmission has timing difference comparing to the previous transmission (e.g., the previous transmission is using the reference timing for sidelink transmission), e.g., $T_{TA,SL}$. In one sub-example, $E_3$ can be configured by higher layer parameter or provided by a pre-configuration. In another sub-example, $E_3$ can be can be determined based on the value of n-TimingAdvanceOffset and/or the SCS, e.g., $E_3=0$ for all SCS when n-TimingAdvanceOffset is "n0"; $E_3=0$ for 15 kHz and 30 kHz and $E_3=1$ for 60 kHz when n-TimingAdvanceOffset is "n25600"; $E_3=0$ for 15 kHz, $E_3=1$ for 30 kHz, and $E_3=2$ for 60 kHz when n-TimingAdvanceOffset is "n39936." In yet another sub-example, $E_3$ can be determined by the UE such that the truncation of the symbol is within one symbol.

In a fifth case (Case 4 in FIG. 14), the intended gap duration after applying the symbol truncation applied to the sidelink transmission is 25 us, and the corresponding value of & is given by TABLE 4. For instance, this case can be applicable to the scenario that the SL transmission has TA difference comparing to the previous transmission (e.g., the previous transmission is using the reference timing for sidelink transmission), e.g., $T_{TA,SL}$. In one sub-example, $E_4$ can be configured by higher layer parameter or provided by a pre-configuration. In another sub-example, $E_4$ can be can be determined based on the value of n-TimingAdvanceOffset and/or the SCS, e.g., $E_4=0$ for 15 kHz and 30 kHz and $E_4=1$ for 60 kHz when n-TimingAdvanceOffset is "n0"; $E_4=0$ for 15 kHz, $E_4=1$ for 30 kHz, and $E_4=2$ for 60 kHz when n-TimingAdvanceOffset is "n25600"; $E_4=0$ for 15 kHz, $E_4=1$ for 30 kHz, and $E_4=2$ for 60 kHz when n-TimingAdvanceOffset is "n39936." In yet another sub-example, $E_4$ can be determined by the UE such that the truncation of the symbol is within one symbol.

In a sixth case (Case 5 in FIG. 14), the intended gap duration after applying the symbol truncation applied to the sidelink transmission is 16 us, and the corresponding value of & is given by TABLE 4. For instance, this case can be applicable to the scenario that the SL transmission has a timing difference comparing to the previous transmission (e.g., the previous transmission is using a different reference timing from the sidelink transmission), wherein the timing difference is denoted as $LT_{TA}$. In one sub-example, $E_5$ can be configured by higher layer parameter or provided by a pre-configuration. In yet another sub-example, $E_5$ can be determined by the UE such that the truncation of the symbol is within one symbol.

In a seventh case (Case 6 in FIG. 14), the intended gap duration after applying the symbol truncation applied to the sidelink transmission is 25 us, and the corresponding value of & is given by TABLE 4. For instance, this case can be applicable to the scenario that the SL transmission has a timing difference comparing to the previous transmission (e.g., the previous transmission is using a different reference timing from the sidelink transmission), wherein the TA difference is denoted as $dT_{TA}$. In one sub-example, $E_6$ can be configured by higher layer parameter or provided by a pre-configuration. In yet another sub-example, $E_6$ can be determined by the UE such that the truncation of the symbol is within one symbol.

For $\Delta T_{TA}$ in the above examples, it can include at least one of the timing differences: 1) when the previous transmission is a SL transmission, $\Delta T_{TA}$ can include the propagation delay difference between the transmission and the previous transmission $T_{prop}$; 2) when the previous transmission is a SL transmission, and the timing references of the SL transmission and the previous SL transmission are not synchronized, $\Delta T_{TA}$ can include the timing difference of the timing references $\Delta T_{sync}$; 3) when the previous transmission is a UL transmission, $\Delta T_{TA}$ can include the timing difference between the sidelink transmission and the uplink TA, e.g., $\Delta T_{TA}=T_{TA,SL}-T_{TA}$; 4) when the previous transmission is a UL transmission, and the timing reference of the SL transmission has a timing difference from the DL timing associated with the UL transmission, then $\Delta T_{TA}$ can include such timing difference $\Delta T_{sync}$.

TABLE 4

Parameters of symbol truncation for sidelink transmission

| $T_{ext}$ index i | $E_i$ | $\Delta_i$ |
|---|---|---|
| 0 | — | — |
| 1 | $E_1$ | $16 \cdot 10^{-6}$ |
| 2 | $E_2$ | $25 \cdot 10^{-6}$ |
| 3 | $E_3$ | $16 \cdot 10^{-6} + T_{TA, SL}$ |
| 4 | $E_4$ | $25 \cdot 10^{-6} + T_{TA, SL}$ |

TABLE 4-continued

Parameters of symbol truncation for sidelink transmission

| $T_{ext}$ index i | $E_i$ | $\Delta_i$ |
| --- | --- | --- |
| 5 | $E_5$ | $16 \cdot 10^{-6} + \Delta T_{TA}$ |
| 6 | $E_6$ | $25 \cdot 10^{-6} + \Delta T_{TA}$ |

In one embodiment, a UE can be indicated (explicitly or implicitly) with at least one of the cases for the sidelink symbol adjustment according to the mentioned embodiments/examples in the present disclosure. The at least one of the cases for the sidelink symbol adjustment can be included in the information about channel access procedure.

In one approach, at least one of the cases for the sidelink symbol adjustment according to the mentioned embodiments/examples in the present disclosure can be supported for sidelink transmission, and the case(s) supported is fixed in the specification.

In one example, the support of symbol adjustment is only for a sidelink with operation with shared spectrum channel access.

In one example, Case 1 of forward symbol extension can be supported for a sidelink transmission and fixed in the specification. For one sub-example, it is supported when the previous transmission is also a sidelink transmission from the same transmitter UE.

In another example, Case 1 of backward symbol extension is supported for a sidelink transmission and fixed in the specification. For one sub-example, it is supported when the following transmission is also a sidelink transmission from the same transmitter UE.

In another approach, at least one of the cases for the sidelink symbol adjustment according to the mentioned embodiments/examples in the present disclosure can be supported for sidelink transmission, and the case(s) supported is indicated by higher layer parameters or provided by a pre-configuration.

In one example, the support of symbol adjustment is only for a sidelink with operation with shared spectrum channel access.

In one example, a UE can be provided with one case of the forward symbol extension for sidelink transmissions by a RRC parameter or by a pre-configuration.

In another example, a UE can be provided with one case of the backward symbol extension for sidelink transmissions by a RRC parameter or by a pre-configuration.

In yet another approach, at least one of the cases for the sidelink symbol adjustment according to the mentioned embodiments/examples in the present disclosure can be supported for sidelink transmission, and the case(s) supported is indicated by MAC CE.

In one example, the support of symbol adjustment is only for a sidelink with operation with shared spectrum channel access.

In one example, a UE can be provided with one case of the forward symbol extension for sidelink transmissions by a MAC CE.

In another example, a UE can be provided with one case of the backward symbol extension for sidelink transmissions by a MAC CE.

In yet another approach, at least one of the cases for the sidelink symbol adjustment according to the mentioned embodiments/examples in the present disclosure can be indicated in a DCI scheduling sidelink transmission(s) (e.g., included in a field in the DCI, potentially combined with other information related to channel access procedure).

In one example, the DCI format is DCI format 3_0. The UE receiving the DCI format 3_0 applies the symbol adjustment for the SL transmission(s) by the DCI format 3_0.

In another example, the DCI format is DCI format 3_1. The UE receiving the DCI format 3_1 applies the symbol adjustment for the SL transmission(s) by the DCI format 3_1.

In yet another example, the DCI format can be a new DCI format (e.g., a different DCI format from DCI format 3_0 and DCI format 3_1), wherein the intended receiver(s) of this new DCI format at least includes the transmitter and receiver of the SL transmission that sidelink symbol adjustment is applied. For instance, this DCI format can be broadcast. The sidelink symbol adjustment can be applied to the first SL transmission after the DL transmission including the DCI format.

In one example, the support of symbol adjustment is only for a sidelink with operation with shared spectrum channel access.

In one example, the indication of symbol adjustment can be jointly coded with the type of channel access procedures.

In one example, only forward symbol extension is supported for sidelink transmissions, and a UE can be indicated by a DCI format with at least one index in TABLE 4 (or a subset of rows in TABLE 2) for determining the duration of the forward symbol extension.

In another example, only backward symbol extension is supported for sidelink transmissions, and a UE can be indicated by a DCI format with at least one index in TABLE 3 (or a subset of rows in TABLE 3) for determining the duration of the forward symbol extension.

In yet another example, both backward symbol extension and forward symbol extension are supported for sidelink trasnmissions, and a UE can be indicated by a DCI format with at least one index in TABLE 3 (or a subset of rows in TABLE 3) and/or at least one index in TABLE 2 (or a subset of rows in TABLE 2) for determining the duration of the backward and/or forward symbol extension, respectively.

In yet another example, both backward symbol extension and symbol truncation are supported for sidelink transmissions, and a UE can be indicated by a DCI format with at least one index in TABLE 3 (or a subset of rows in TABLE 3) and/or at least one index in TABLE 4 (or a subset of rows in TABLE 4) for determining the duration of the backward symbol extension and/or symbol truncation, respectively.

In one example, when the DCI format schedules N PSSCH and/or PSCCH transmissions (N≥1), the DCI format includes N indications of symbol adjustment, and each of the indications is applied to one PSSCH and/or PSCCH transmission respectively.

In another example, when the DCI format schedules N PSSCH and/or PSCCH transmissions (N≥1), the DCI format includes single indication of symbol adjustment, and the single indication is applied to each of the PSSCH and/or PSCCH transmissions (e.g., all the PSSCH and/or PSCCH transmissions apply the same symbol adjustment).

In yet another example, when the DCI format schedules N PSSCH and/or PSCCH transmissions (N≥1), the DCI format includes single indication of symbol adjustment, and the single indication is applied to the first PSSCH and/or PSCCH transmission scheduled by the DCI.

In yet another example, when the DCI format schedules N PSSCH and/or PSCCH transmissions (N≥1) and the N PSSCH and/or PSCCH transmissions form M transmission bursts (1≤M≤N), wherein one transmission burst is a set of contiguous slots, the DCI format can include M indications of symbol adjustment, and each indication is applied to one burst of PSSCH and/or PSCCH transmissions scheduled by the DCI, respectively.

In yet another approach, at least one of the cases for the sidelink symbol adjustment according to the mentioned embodiments/examples in the present disclosure can be indicated in a SCI scheduling sidelink transmission(s) (e.g., included in a field in the SCI, potentially combined with other information related to channel access procedure).

In one example, the SCI format is SCI format 1_A.

In another example, the SCI format is SCI format 2_A.

In yet another example, the SCI format is SCI format 2_B.

In yet another example, the SCI format can be a new SCI format other than SCI format 1_A, 2_A, or 2_B.

In one example, the support of symbol adjustment is only for a sidelink with operation with shared spectrum channel access.

In one example, for a sidelink transmission, the information on the sidelink symbol adjustment provided by the DCI format is the same as the information on the sidelink symbol adjustment provided by the SCI format. For instance, same field in DCI format indicating the sidelink symbol adjustment can be included in the SCI format.

In another example, for a sidelink transmission, the information on the sidelink symbol adjustment provided by the DCI format is a superset of the information on the sidelink symbol adjustment provided by the SCI format. For instance, when the DCI format N SL transmission, the n-th SCI includes the information on sidelink symbol adjustment for the (n+1)-th to N-th SL transmission, wherein $1 \le n \le N-1$, and the N-th SCI does not include the information on sidelink symbol adjustment. For one further consideration, this instance can be applicable to the case that the sidelink symbol adjustment includes forward symbol extension or symbol truncation.

In yet another example, for a sidelink transmission, the information on the sidelink symbol adjustment provided by the DCI format is a superset of the information on the sidelink symbol adjustment provided by the SCI format. For instance, when the DCI format N SL transmission, the n-th SCI includes the information on sidelink symbol adjustment for the n-th to N-th SL transmission, wherein $1 \le n \le N$. For one further consideration, this instance can be applicable to the case that the sidelink symbol adjustment includes backward symbol extension.

In one example, only forward symbol extension is supported for sidelink trasnmissions, and a UE can be indicated by a SCI format with at least one index in TABLE 2 (or a subset of rows in TABLE 2, e.g., the first 4 rows of TABLE 2) for determining the duration of the forward symbol extension.

In another example, only backward symbol extension is supported for sidelink trasnmissions, and a UE can be indicated by a SCI format with at least one index in TABLE 3 (or a subset of rows in TABLE 3, e.g., the first 4 rows of TABLE 3) for determining the duration of the forward symbol extension.

In yet another example, both backward symbol extension and forward symbol extension are supported for sidelink trasnmissions, and a UE can be indicated by a SCI format with at least one index in TABLE 3 (or a subset of rows in TABLE 3) and/or at least one index in TABLE 2 (or a subset of rows in TABLE 2) for determining the duration of the backward and/or forward symbol extension, respectively.

In yet another example, both backward symbol extension and symbol truncation are supported for sidelink trasnmissions, and a UE can be indicated by a SCI format with at least one index in TABLE 3 (or a subset of rows in TABLE 3) and/or at least one index in TABLE 4 (or a subset of rows in TABLE 4) for determining the duration of the backward symbol extension and/or symbol truncation, respectively.

In one example, when the SCI format schedules N PSSCH and/or PSCCH transmissions ($N \ge 1$), the SCI format includes N indications of symbol adjustment, and each of the indications is applied to one PSSCH and/or PSCCH transmission respectively.

In another example, when the SCI format schedules N PSSCH and/or PSCCH transmissions ($N \ge 1$), the SCI format includes single indication of symbol adjustment, and the single indication is applied to each of the PSSCH and/or PSCCH transmissions (e.g., all the PSSCH and/or PSCCH transmissions apply the same symbol adjustment).

In yet another example, when the SCI format schedules N PSSCH and/or PSCCH transmissions ($N \ge 1$), the SCI format includes single indication of symbol adjustment, and the single indication is applied to the first PSSCH and/or PSCCH transmission scheduled by the SCI.

In yet another example, when the SCI format schedules N PSSCH and/or PSCCH transmissions ($N \ge 1$) and the N PSSCH and/or PSCCH transmissions form M transmission bursts ($1 \le M \le N$), wherein one transmission burst is a set of contiguous slots, the SCI format can include M indications of symbol adjustment, and each indication is applied to one burst of PSSCH and/or PSCCH transmissions scheduled by the SCI, respectively.

In one example, the SCI format includes an indication of symbol adjustment, which is applicable to the next sidelink transmission (e.g., either PSSCH/PSCCH transmission or PSFCH transmission) after the transmission including the SCI format. For instance, if the next transmission after the transmission including the SCI format is a PSSCH/PSCCH transmission, the UE applies the symbol adjustment to the PSSCH/PSCCH transmission; if the next transmission after the transmission including the SCI format is a PSFCH transmission, the UE applies the symbol adjustment to the PSFCH transmission.

In another example, the SCI format includes an indication of symbol adjustment and another indication on which type of channel the symbol adjustment is applied to (e.g., either PSSCH/PSCCH transmission or PSFCH transmission), and the UE receiving the SCI format uses both indications to determine the type of channel to apply the symbol adjustment and the case of the symbol adjustment.

In one embodiment, a sidelink transmission and a uplink transmission can be multiplexed and use the same symbol as the starting symbol of the transmission. For example, the sidelink transmission and the uplink transmission can be FDMed (e.g., mapped to different RBs) or IFDMed (e.g., mapped to different interlaces of RBs). For this embodiment, CP extension can be indicated and applied to the starting symbol for uplink transmission, and forward symbol extension (e.g., CP extension) can be indicated and applied to the starting symbol for sidelink transmission.

In one example, a UE performs channel access procedures for the sidelink transmission and the uplink transmission separately (e.g., based on UE's capability), and the UE could be indicated with a first CP extension for the sidelink transmission and a second CP extension for the uplink transmission.

In one sub-example, the UE expects the transmission starting time (e.g., with respect to DL timing) for the sidelink transmission and uplink transmission are aligned after applying the CP extensions respectively.

In another sub-example, if the starting time (e.g., with respect to DL timing) for the sidelink transmission and uplink transmission after applying the CP extensions respectively are not aligned, the UE can further extend the CP for the transmission with later starting time and align the starting time of the sidelink and uplink transmissions. For this sub-example, the UE may adjust the channel access procedure for the transmission with the later starting time to the same channel access procedure for the transmission with the earlier starting time.

In one example, a UE performs channel access procedure for the sidelink transmission and the uplink transmission jointly (e.g., based on UE's capability), and the UE could be indicated with a first CP extension for the sidelink transmission and a second CP extension for the uplink transmission.

In one sub-example, the UE expects the transmission starting time (e.g., with respect to DL timing) for the sidelink transmission and uplink transmission are aligned after applying the CP extensions respectively.

In another sub-example, if the starting time (e.g., with respect to DL timing) for the sidelink transmission and uplink transmission after applying the CP extensions respectively are not aligned, the UE performs the joint channel access procedure before the earlier starting time of the transmission and start transmitting both slidelink and uplink transmissions if the channel access procedure completes.

Figure 15:
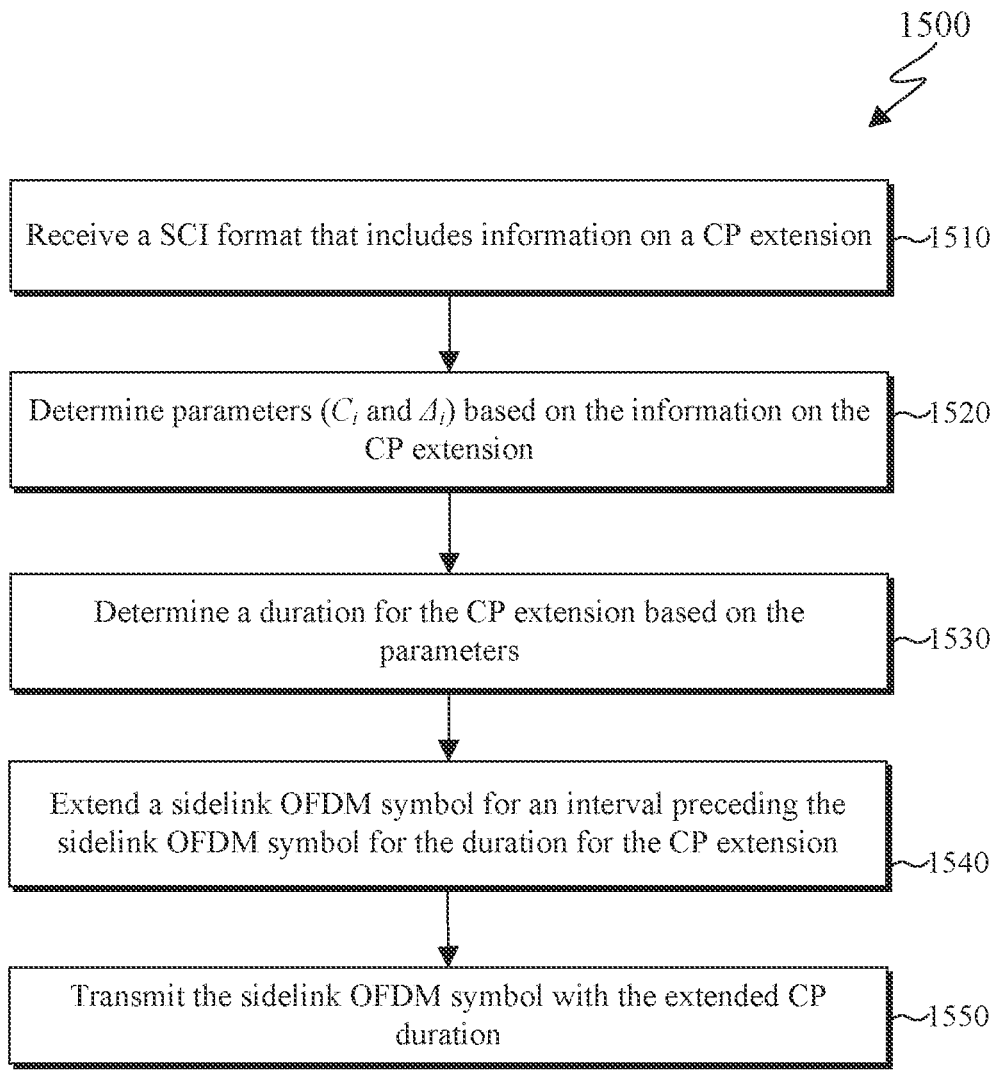
FIG. 15 illustrates an example method for transmitting a sidelink OFDM symbol according to embodiments of the present disclosure.

FIG. 15 illustrates an example method 1500 for transmitting a sidelink OFDM symbol according to embodiments of the present disclosure. The steps of the method 1500 of FIG. 15 can be performed by any of the UEs 111-116 of FIG. 1, such as the UE 116 of FIG. 3. The method 1500 is for illustration only and other embodiments can be used without departing from the scope of the present disclosure.

The method 1500 begins with the UE receiving a SCI format that includes information on a CP extension (step 1510). For example, in step 1510, the SCI format is a SCI format 1_A, 2_A, or 2_B.

The UE then determines parameters ($C_i$ and $\Delta_i$) based on the information on the CP extension (step 1520). For example, in step 1520, the parameters ($C_i$ and $\Delta_i$) are determined based on the SCI format as of four cases including: case 0: $T_{ext}=0$, and $C_i$ and $\Delta_i$ are not applicable; case 1: $C_i=C_1$, and $\Delta_i=0$; case 2: $C_i=C_2$, and $\Delta_i=16\cdot10^{-6}$; and case 3: $C_i=C_3$, and $\Delta_i=25\cdot10^{-6}$. For example, if the case 1, then $C_1$ is fixed as 1. If the case is case 2, then $C_2$ is provided by a higher layer parameter or a pre-configuration or is determined by the UE such that $T_{ext}$ is within one OFDM symbol, if not provided by the higher layer parameter or the pre-configuration. If the case is case, then $C_3$ is provided by a higher layer parameter or a pre-configuration or is determined by the UE such that $T_{ext}$ is within one OFDM symbol, if not provided by the higher layer parameter or the pre-configuration.

The UE then determines a duration for the CP extension based on the parameters (step 1530). The UE then extends a sidelink OFDM symbol for an interval preceding the sidelink OFDM symbol for the duration for the CP extension (step 1540). For example, in step 1540, the interval preceding the sidelink OFDM symbol may be given by $t_{start,l}^{\mu}-T_{ext}\leq t<t_{start,l}^{\mu}$, where $t_{start,l}^{\mu}$ is a start instance of the sidelink OFDM symbol, $T_{ext}=\min(\max(T'_{ext}, 0), T_{symb,(l-1)mod7\cdot2^{\mu}})$, and $T'_{ext}=\Sigma_{k=1}^{C_i} T_{symb,(l-k)mod7\cdot2^{\mu}}-\Delta_i$. In various embodiments, the sidelink OFDM symbol is a first OFDM symbol (e.g., in time and/or frequency) of a PSSCH the SCI format. In various embodiments, the SCI format schedules multiple PSSCH transmissions, and the PSSCH transmission is first (e.g., in time and/or frequency) among the multiple PSSCH transmissions. In various embodiments, the sidelink OFDM symbol is first (e.g., in time and/or frequency) among OFDM symbols of a PSFCH transmission after a transmission of the SCI format.

The UE then transmits the sidelink OFDM symbol with the extended CP duration (step 1550).

The above flowcharts and signaling flow diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive a sidelink control information (SCI) format that includes information on a cyclic prefix (CP) extension; and
   a processor operably coupled to the transceiver, the processor configured to:
   determine parameters $C_i$ and $\Delta_i$ based on the information on the CP extension, wherein $C_i$ defines a number of symbols including forward symbol extension and $\Delta_i$ defines a duration of the forward symbol extension,
   determine a duration for the CP extension based on the parameters, and
   extend a sidelink orthogonal frequency-division multiplexing (OFDM) symbol for an interval preceding the sidelink OFDM symbol for the duration for the CP extension,
   wherein the transceiver further configured to transmit the sidelink OFDM symbol with a duration extended based on the duration for the CP extension.

2. The UE of claim 1, wherein the SCI format is a SCI format 1_A, 2_A, or 2_B.

3. The UE of claim 1, wherein:
   the interval preceding the sidelink OFDM symbol is given by $t_{start,l}^{\mu}-T_{ext}\leq t<t_{start,l}^{\mu}$,
   $t_{start,l}^{\mu}$ is a start instance of the sidelink OFDM symbol, and
   $T_{ext}=\min(\max(T_{ext}',0), T_{symb,(l-1)mod7\cdot2^{\mu}})$, wherein $T_{ext}'=\Sigma_{k=1}^{C_i}T_{symb,(l-k)mod7\cdot2^{\mu}}-\Delta_i$.

4. The UE of claim 1, wherein the sidelink OFDM symbol is a first OFDM symbol of a physical sidelink shared channel (PSSCH) transmission scheduled by the SCI format.

5. The UE of claim 4, wherein:
   the SCI format schedules multiple PSSCH transmissions, and
   the PSSCH transmission is first among the multiple PSSCH transmissions.

6. The UE of claim 1, wherein the sidelink OFDM symbol is first among OFDM symbols of a physical sidelink feedback channel (PSFCH) transmission after a transmission of the SCI format.

7. The UE of claim 1, wherein the parameters ($C_i$ and $\Delta_i$) are determined based on the SCI format as one case from:
case 0: $T_{ext}=0$, and $C_i$ and $\Delta_i$ are not applicable;
case 1: $C_i=C_1$, and $\Delta_i=0$;
case 2: $C_i=C_2$, and $\Delta_i=16\cdot10^{-6}$; or
case 3: $C_i=C_3$, and $\Delta_i=25\cdot10^{-6}$.

8. The UE of claim 7, wherein the one case is case 1 and $C_1$ is fixed as 1.

9. The UE of claim 7, wherein the one case is case 2 and $C_2$
is provided by a higher layer parameter or a pre-configuration, or
is determined by the UE such that $T_{ext}$ is within one OFDM symbol, if not provided by the higher layer parameter or the pre-configuration.

10. The UE of claim 7, wherein the one case is case 3 and $C_3$
is provided by a higher layer parameter or a pre-configuration, or
is determined by the UE such that Text is within one OFDM symbol, if not provided by the higher layer parameter or the pre-configuration.

11. A method of user equipment (UE) in a wireless communication system, the method comprising:
receiving a sidelink control information (SCI) format that includes information on a cyclic prefix (CP) extension;
determining parameters $C_i$ and $\Delta_i$ based on the information on the CP extension, wherein $C_i$ defines a number of symbols including forward symbol extension and $\Delta_i$ defines a duration of the forward symbol extension;
determining a duration for the CP extension based on the parameters;
extending a sidelink orthogonal frequency-division multiplexing (OFDM) symbol for an interval preceding the sidelink OFDM symbol for the duration for the CP extension; and
transmitting the sidelink OFDM symbol with a duration extended based on the duration for the CP extension.

12. The method of claim 11, wherein the SCI format is a SCI format 1_A, 2_A, or 2_B.

13. The method of claim 11, wherein:
the interval preceding the sidelink OFDM symbol is given by $t_{start,l}^{\mu}-T_{ext} \leq t < t_{start,l}^{\mu}$,
$t_{start,l}^{\mu}$ is a start instance of the sidelink OFDM symbol, and
$T_{ext}=\min(\max(T_{ext}',0), T_{symb,(l-1)mod7\cdot2^{\mu}}^{\mu})$, wherein $$T_{ext}' = \sum_{k=1}^{C_i} T_{symb,(l-k)mod7\cdot2^{\mu}}^{\mu} - \Delta_i.$$

14. The method of claim 11, wherein the sidelink OFDM symbol is a first OFDM symbol of a physical sidelink shared channel (PSSCH) transmission scheduled by the SCI format.

15. The method of claim 14, wherein:
the SCI format schedules multiple PSSCH transmissions, and
the PSSCH transmission is first among the multiple PSSCH transmission.

16. The method of claim 11, wherein the sidelink OFDM symbol is first among OFDM symbols of a physical sidelink feedback channel (PSFCH) transmission after a transmission of the SCI format.

17. The method of claim 11, wherein the parameters ($C_i$ and $\Delta_i$) are determined based on the SCI format as one case from:
case 0: $T_{ext}=0$, and $C_i$ and $\Delta_i$ are not applicable;
case 1: $C_i=C_1$, and $\Delta_i=0$;
case 2: $C_i=C_2$, and $\Delta_i=16\cdot10^{-6}$; or
case 3: $C_i=C_3$, and $\Delta_i=25\cdot10^{-6}$.

18. The method of claim 17, wherein the one case is case 1 and $C_1$ is fixed as 1.

19. The method of claim 17, wherein the one case is case 2 and $C_2$ is provided by a higher layer parameter or a pre-configuration, or is determined by the UE such that Text is within one OFDM symbol, if not provided by a higher layer parameter or a pre-configuration.

20. The method of claim 17, wherein the one case is case 3 and $C_3$ is provided by a higher layer parameter or a pre-configuration, or is determined by the UE such that Text is within one OFDM symbol, if not provided by a higher layer parameter or a pre-configuration.

\* \* \* \* \*